(12) United States Patent
Roussel et al.

(10) Patent No.: US 12,561,688 B1
(45) Date of Patent: Feb. 24, 2026

(54) MINI-GRAPH BASED FRAUD DETECTION

(71) Applicant: Jumio Corporation, Sunnyvale, CA (US)

(72) Inventors: Arnaud Roussel, St. Basile le Grand (CA); Hasmik Martirosyan, St. Catherines (CA); Ganna Akymenko, Vienna (AT); Mihaela Manigutiu, Vienna (AT)

(73) Assignee: Jumio Corporation, Sunnyvale, CA (US)

( * ) Notice: Subject to any disclaimer, the term of this patent is extended or adjusted under 35 U.S.C. 154(b) by 0 days.

(21) Appl. No.: 18/759,270

(22) Filed: Jun. 28, 2024

(51) Int. Cl.
G06Q 20/40 (2012.01)

(52) U.S. Cl.
CPC ................................ G06Q 20/4016 (2013.01)

(58) Field of Classification Search
CPC .................................................. G06Q 20/4016
See application file for complete search history.

(56) References Cited

U.S. PATENT DOCUMENTS

| | | | |
|---|---|---|---|
| 4,897,814 A | 1/1990 | Clark | |
| 5,425,110 A | 6/1995 | Spitz | |
| 5,544,255 A | 8/1996 | Smithies et al. | |
| 5,668,897 A | 9/1997 | Stolfo | |
| 5,748,780 A | 5/1998 | Stolfo | |
| 5,838,814 A | 11/1998 | Moore | |
| 6,363,162 B1 | 3/2002 | Moed et al. | |
| 7,040,539 B1 | 5/2006 | Stover | |

| | | |
|---|---|---|
| 7,831,531 B1 | 11/2010 | Baluja et al. |
| 8,326,761 B1 | 12/2012 | Hecht et al. |
| 8,352,494 B1 | 1/2013 | Badoiu |
| 8,886,648 B1 | 11/2014 | Procopio et al. |
| 8,910,032 B2 | 12/2014 | Graves et al. |
| 9,135,517 B1 | 9/2015 | Adams |

(Continued)

FOREIGN PATENT DOCUMENTS

| | | |
|---|---|---|
| AU | 2018100581 A4 | 6/2018 |
| MY | 192715 A | 9/2022 |

OTHER PUBLICATIONS

PCT International Search Report and Written Opinion; Application No. PCT/US2024/048525 Jumio Corporation, International filing date of Sep. 26, 2024, date of mailing Nov. 27, 2024, 10 pages. 2024.

(Continued)

*Primary Examiner* — Scott S Trotter
(74) *Attorney, Agent, or Firm* — PATENT LAW WORKS LLP

(57) ABSTRACT

The disclosure includes a system and method for obtaining transaction data associated with a transaction under test including image data associated with a first image; generating a set of transaction parts including a first transaction part and a second transaction part; generating a first embedding; obtaining a first result set based on a first transaction part comprising a first set of embeddings associated with a first set of prior transactions; obtaining a second result set based on a second transaction part associated with a second set of prior transactions; generating a mini-graph associated with the transaction under test; and classifying, using a first machine learning model, whether the mini-graph associated with the transaction under test is indicative of fraud.

20 Claims, 14 Drawing Sheets

100

(56)                 References Cited

U.S. PATENT DOCUMENTS

| | | | |
|---|---|---|---|
| 9,836,591 | B2 | 12/2017 | John et al. |
| 10,320,807 | B2 | 6/2019 | Khan |
| 10,628,702 | B1 | 4/2020 | Gerstner et al. |
| 11,144,752 | B1 | 10/2021 | Castelblanco et al. |
| 11,416,562 | B1 | 8/2022 | Gruhl et al. |
| 11,593,439 | B1 | 2/2023 | Avadhani et al. |
| 11,625,954 | B2 | 4/2023 | Kwak et al. |
| 11,715,102 | B2 | 8/2023 | Edwards et al. |
| 11,900,755 | B1 | 2/2024 | Bueche, Jr. |
| 12,197,483 | B1 | 1/2025 | Shmukler et al. |
| 2002/0064305 | A1 | 5/2002 | Taylor |
| 2003/0172066 | A1 | 9/2003 | Cooper et al. |
| 2003/0229637 | A1 | 12/2003 | Baxter et al. |
| 2004/0155877 | A1 | 8/2004 | Hong et al. |
| 2006/0026156 | A1 | 2/2006 | Zuleba |
| 2006/0041506 | A1 | 2/2006 | Mason et al. |
| 2006/0124726 | A1 | 6/2006 | Kotovich et al. |
| 2006/0164682 | A1 | 7/2006 | Lev |
| 2007/0078846 | A1 | 4/2007 | Gulli et al. |
| 2007/0086628 | A1 | 4/2007 | Fuchs et al. |
| 2007/0116328 | A1 | 5/2007 | Sablak |
| 2007/0150387 | A1 | 6/2007 | Seubert et al. |
| 2008/0065630 | A1 | 3/2008 | Luo et al. |
| 2008/0149713 | A1 | 6/2008 | Brundage |
| 2009/0060396 | A1 | 3/2009 | Blessan et al. |
| 2009/0152357 | A1 | 6/2009 | Lei et al. |
| 2009/0261158 | A1 | 10/2009 | Lawson |
| 2010/0027896 | A1 | 2/2010 | Geva et al. |
| 2011/0057040 | A1 | 3/2011 | Jones |
| 2011/0128360 | A1 | 6/2011 | Hatzav et al. |
| 2014/0002872 | A1 | 1/2014 | Cook |
| 2015/0100590 | A1 | 4/2015 | Robinson et al. |
| 2015/0242592 | A1 | 8/2015 | Weiss et al. |
| 2015/0341370 | A1 | 11/2015 | Khan |
| 2016/0005050 | A1 | 1/2016 | Teman |
| 2016/0098399 | A1 | 4/2016 | Casperson |
| 2016/0210450 | A1 | 7/2016 | Su |
| 2017/0161375 | A1 | 6/2017 | Stoica et al. |
| 2017/0193285 | A1 | 7/2017 | Negi |
| 2017/0277945 | A1 | 9/2017 | Budihal et al. |
| 2017/0322932 | A1 | 11/2017 | Deschenes et al. |
| 2017/0337449 | A1 | 11/2017 | Hamada et al. |
| 2018/0060874 | A1 | 3/2018 | Kelts et al. |
| 2018/0075090 | A1 | 3/2018 | Knight et al. |
| 2018/0186164 | A1 | 7/2018 | Wu |
| 2018/0204113 | A1 | 7/2018 | Galron et al. |
| 2018/0293461 | A1 | 10/2018 | Le et al. |
| 2018/0300296 | A1 | 10/2018 | Ziraknejad et al. |
| 2018/0373859 | A1 | 12/2018 | Ganong |
| 2019/0035431 | A1 | 1/2019 | Attorre |
| 2019/0205686 | A1 | 7/2019 | Mayer et al. |
| 2019/0272549 | A1 | 9/2019 | Mossoba et al. |
| 2019/0278986 | A1 | 9/2019 | Nepomniachtchi |
| 2020/0184201 | A1 | 6/2020 | Kaehler |
| 2020/0304650 | A1 | 9/2020 | Roach |
| 2020/0342600 | A1 | 10/2020 | Sjstrand et al. |
| 2020/0366671 | A1 | 11/2020 | Larson et al. |
| 2021/0075788 | A1 | 3/2021 | Pasterk et al. |
| 2021/0124919 | A1 | 4/2021 | Balakrishnan |
| 2021/0174016 | A1 | 6/2021 | Fox et al. |
| 2021/0248401 | A1 | 8/2021 | Timoshenko et al. |
| 2021/0259660 | A1 | 8/2021 | Bharat et al. |
| 2021/0307841 | A1 | 10/2021 | Buch et al. |
| 2021/0320801 | A1 | 10/2021 | Wyss |
| 2021/0326461 | A1 | 10/2021 | Paul et al. |
| 2021/0326629 | A1 | 10/2021 | Slattery |
| 2022/0028086 | A1 | 1/2022 | Woodard et al. |
| 2022/0058660 | A1 | 2/2022 | Ivanov |
| 2022/0114456 | A1 | 4/2022 | Nouri et al. |
| 2022/0180113 | A1 | 6/2022 | Patel et al. |
| 2022/0182430 | A1 | 6/2022 | Bennett-James et al. |
| 2022/0385880 | A1 | 12/2022 | Nims |
| 2023/0013380 | A1 | 1/2023 | Choi et al. |
| 2023/0017185 | A1 | 1/2023 | Cheong et al. |
| 2023/0083000 | A1 | 3/2023 | Fujimoto et al. |
| 2023/0113148 | A1 | 4/2023 | Zlotnick |
| 2023/0129350 | A1 | 4/2023 | Bryan et al. |
| 2023/0143239 | A1 | 5/2023 | Yusuf et al. |
| 2023/0196628 | A1 | 6/2023 | Bischoff et al. |
| 2023/0298031 | A1* | 9/2023 | Drapeau ............... G06N 3/0499 |
| | | | 705/72 |
| 2023/0421602 | A1 | 12/2023 | Boyer et al. |
| 2024/0046686 | A1 | 2/2024 | Ye et al. |
| 2024/0202294 | A1 | 6/2024 | Yogerst et al. |
| 2024/0205239 | A1 | 6/2024 | Bonev et al. |
| 2024/0411982 | A1 | 12/2024 | Malanga et al. |
| 2025/0005950 | A1 | 1/2025 | Eren |
| 2025/0225527 | A1* | 7/2025 | Jiang .................. G06Q 20/4016 |

OTHER PUBLICATIONS

"7 Best Face Morph Apps 2024 (Morph Two Faces Together)." ContentMaverickscom, Content Mavericks, 2024, contentmavericks. com/best-face-morph-app/. 2024 Web. 25 pgs. 2024.

"Levenshtein Distance." Wikipedia, Wikimedia Foundation, Dec. 23, 2023, en.wikipedia.org/wiki/Levenshtein_distance. Web. 6 pgs. 2023.

"New Method Detects Deepfake Videos with up to 99% Accuracy." News, May 3, 2022, news.ucr.edu/articles/2022/05/03/new-method-detects-deepfake-videos-99-accuracy. Web. 3 pgs. 2022.

Aslam, Asra, et al., May 15, 2019, Depth-Map Generation using Pixel Matching in Stereoscopic Pair of Images, https://arxiv.org/pdf/1902.03471.pdf, 5 pgs. 2019.

Bassil, Youssef, and Mohammad Alwani. "Context-Sensitive Spelling Correction Using Google Web 1T 5-Gram Information." Computer and Information Science (Toronto), vol. 5, No. 3, 2012, p. 37. 2012.

Bassil, Youssef, and Mohammad Alwani. "OCR Post-Processing Error Correction Algorithm Using Google Online Spelling Suggestion." ArXiv.org, 2012, pp. arXiv.org, 2012. 2012.

Benalcazar, Daniel, et al. "Synthetic ID Card Image Generation for Improving Presentation Attack Detection." IEEE Transactions on Information Forensics and Security, vol. 18, 2023, pp. 1814-1824. 2023.

Canada Passport Phot Security Features, Canada.ca, Government of Canada (Dec. 20, 2022) https://www.canada.ca/en/immigration-refugees-citizenship/services/canadian-passports/photos. html#photo, webpage 11 pgs. 2022.

Casado, Constantino Alvarez, et al. "Real-time Face Alignment: Evaluation Methods, Training Strategies and Implementation Optimization." Journal of Real-time Image Processing 18.6 (2021): 2239-2267. Web. 2021.

Deepswap.AI, "Deepswap—Best Face and Video Edit Tools Online." DeepSwap AI, www.deepswap.ai/?utm_source=bing&cp_id=441169896&msclkid=eb76125c4d531cf9797e77325a694067. Accessed Dec. 2023. Web. 11 pgs. 2023.

DEVCODEF1 Editors, Using LLMS for OCR text proofreading: A guide for software developers. Dev Code F1. May 26, 2023, <https://devcodef1.com/news/1007434/llms-for-ocr-text-proofreading> Web. 3 pgs. 2023.

Di Guardo, Fabrizio. "Facemask-a Real-Time Face Morphing Tool." Medium, Level Up Coding, May 2, 2023, levelup.gitconnected. com/facemask-a-real-time-face-morphing-tool-5b343591a237. May 2, 2023.

Edge Detection Using OpenCV, LearnOpenCV.com, (2023) https:// learnopencv.com/edge-detection-using-opencv/, webpage. 10 pgs. 2023.

Elsayed, M et al. "A New Method for Full Reference Image Blur Measure." International Journal of Simulation: Systems Science and Technology V19 N1 (Feb. 1, 2018): 7.1-7.5 2018 https://doi.org/10.5013/IJSST.a.19.01.7. 2018.

"Face Landmark Detection Guide | Google AI Edge | Google AI for Developers." Google, ai.google.dev/edge/mediapipe/solutions/vision/face_landmarker.

Faceshape. "Face Morphing Simulator—Morph Two Faces Together." Face Morphing Simulator—Morph Two Faces Together, www. faceshape.com/face-morph. (2022) Web. 2 pgs. 2022.

(56)      References Cited

OTHER PUBLICATIONS

Fadilpašić, Sead. "Deepfake Fraud Attacks Are Hitting More and More Businesses." TechRadar, TechRadar Pro, Feb. 24, 2023, www.techradar.com/news/deepfake-fraud-attacks-are-hitting-more-and-more-businesses. Accessed Jan. 12, 2024. Web. 8 pgs. 2023.

Github, Use Llama2 to Improve the Accuracy of Tesseract OCR. GitHub. (n.d.). https://github.com/Dicklesworthstone/llama2_aided_tesseract> Web. Last updated Aug. 2, 2023. 3 pgs. 2023.

Help Net Security. "Detecting Face Morphing: A Simple Guide to Countering Complex Identity Fraud." Help Net Security, Mar. 16, 2023, www.helpnetsecurity.com/2023/03/20/facial-morphing-technology/. Web. 5 pgs. 2023.

Hu, Yifei, et al. "Misspelling Correction with Pre-Trained Contextual Language Model." ArXiv.org, 2021, pp. arXiv.org, 2021. 2021.

"Image Segmentation Guide | Google AI Edge | Google AI for Developers." Google, ai.google.dev/edge/mediapipe/solutions/vision/image_segmenter.

Kaspersky Secure Futures Editors, DevCodeF1. "Using LLMS for OCR Text Proofreading: A Guide for Software Developers." Dev Code F1, DevCodeF1.Com—Software Developer News and Knowledge Base, May 26, 2023, devcodef1.com/news/1007434/llms-for-ocr-text-proofreading. Accessed Jan. 12, 2024. Web. 8 pgs. 2023.

Kirillov, Alexander et al. "Segment Anything." 2023 IEEE/CVF International Conference on Computer Vision (ICCV), Oct. 1, 2023, doi:10.1109/iccv51070.2023.00371. Oct. 1, 2023.

Kramer, Robin S. S., et al. "Face Morphing Attacks: Investigating Detection with Humans and Computers." Cognitive Research: Principles and Implications, vol. 4, No. 1, 2019, p. 28. 2019.

Kumar, Varun. "14 Best Deepfake Apps and Tools in 2024." RankRed, Jan. 1, 2024, www.rankred.com/best-deepfake-apps-tools/. Web. 22 pgs. 2024.

"Large Language and Vision Assistant." LLaVA, llava-vl.github.io/.

Lee, Jung-Hun, et al. "Deep Learning-Based Context-Sensitive Spelling Typing Error Correction." IEEE Access, vol. 8, 2020, pp. 152565-152578. 2020.

Liu, Haotian, et al. "Visual Instruction Tuning." 37th Conference on Neural Information Processing Systems, Dec. 11, 2023, arxiv.org/pdf/2304.08485. Dec. 11, 2023.

Liu, Zhaoxiang, et al. "Facial Pose Estimation by Deep Learning from Label Distributions." (2019). Web. IEEE/CVF International Conference on Computer Vision Workshop (ICCVW), 9 pgs. 2019.

"Llava 1.6—a Hugging Face Space by Liuhaotian." LLaVA 1.6—a Hugging Face Space by Liuhaotian, huggingface.co/spaces/liuhaotian/LLaVA-1.6.

Lowphansirkul, Lalita, et al. "WangchanBERTa: Pretraining Transformer-Based Thai Language Models." ArXiv.org, 2021, pp. arXiv.org, 2021. 2021.

Luo, Yinhui et al. "A Review of Homography Estimation: Advances and Challenges." Electronics 2023 pp. 4977-4977. https://www.mdpi.com/2079-9292/12/24/4977 2023.

Lyu, Siwei, "Detecting 'deepfake' Videos in the Blink of an Eye." The Conversation, Sep. 15, 2022, theconversation.com/detecting-deepfake-videos-in-the-blink-of-an-eye-101072. Web. 4 pgs. 2022.

Mazaheri, Ghazal et al. "2022 Ieee/Cvf Winter Conference on Applications of Computer Vision (Wacv)." Detection and Localization of Facial Expression Manipulations IEEE 2022 pp. 2773-2783 2022.

Nightingale, Sophie J., et al. "Perceptual and Computational Detection of Face Morphing." Journal of Vision (Charlottesville, Va.), vol. 21, No. 3, 2021, p. 4. 2021.

Passport Photo Specifications., Government of Canada (2015) https://www.canada.ca/content/dam/ircc/migration/ircc/english/pdf/pub/pass-photo-spec-eng.pdf, 5 pgs. 2015.

PICSI.AI, "Create Realistic Face Morphs" Picsi.AI, InsightFace, 2023, www.picsi.ai/. Web. 8 pgs. 2023.

Rosebrock, A. (Nov. 16, 2021). OCR passports with opencv and Tesseract. PyImageSearch. <https://pyimagesearch.com/2021/12/01/ocr-passports-with-opencv-and-tesseract/> Web. 24 pgs. 2021.

Rosebrock, Adrian, "OpenCV Fast Fourier Transform (FFT) for blur detection in images and video streams." PyImageSearch.com, Jun. 15, 2020, webpage, 21 pgs. https://pyimagesearch.com/2020/06/15/opencv-fast-fourier-transform-fft-for-blur-detection-in-images-and-video-streams/ 2020.

Rosebrock, Adrian, Blur Detection with OpenCV PyImageSearch.com, Sep. 7, 2015, https://pyimagesearch.com/2015/09/07/blur-detection-with-opencv/, webpage, 13 pgs. 2015.

Sadeghzadeh, Arezoo, et al., "Pose-invariant face recognition based on matching the occlusion free regions aligned by 3D generic model." IET Computer Vision, Aug. 2020, vol. 14, Issue 5, pp. 177-287. 2020.

Schulz, Daniel, et al., "Identify Documents Image Quality Assessment." European Association for Signal Processing, Proceedings 2022 pp. 1017-1021. 2022.

Seibold, C., et al., "Detection of Face Morphing Attacks by Deep Learning." Digital Forensics and Watermarking. IWDW (2017). Lecture Notes in Computer Science(), vol. 10431. Springer, Cham. https://doi.org/10.1007/978-3-319-64185-0_9 2017.

Shokat, Sana, et al. "Analysis and Evaluation of Braille to Text Conversion Methods." Mobile Information Systems, vol. 2020, 2020, pp. 1-14. 2020.

Shokat, Sana, et al. "Characterization of English Braille Patterns Using Automated Tools and RICA Based Feature Extraction Methods." Sensors (Basel, Switzerland), vol. 22, No. 5, 2022, p. 1836. 2022.

Tesseract—OCR, Improving the Quality of the Output Github.com, Tesseract User Manual v. 5.x, 9 pgs, updated Dec. 5, 2023. Web. 2023.

Times, Global. "Tencent Launches Large Language Model 'Hunyuan' amid Global Generative AI Frenzy." Global Times, Sep. 7, 2023, www.globaltimes.cn/page/202309/1297761.shtml. 6 pgs. 2023.

Wang, Xin, et al. "Attribute-Aware Implicit Modality Alignment for Text Attribute Person Search." Arxiv.Org, Jun. 6, 2024. Jun. 6, 2024.

Wang, Zhe, et al. "Attribute-guided Transformer for Robust Person Re-identification." IET Computer Vision, vol. 17, No. 8, Jun. 23, 2023, pp. 977-992, doi:10.1049/cvi2.12215. Jun. 23, 2023.

PCT International Search Report and Written Opinion; Application No. PCT/US24/62269 Jumio Corporation, International filing date of Dec. 30, 2024, date of mailing Mar. 7, 2025, 11 pages.

Youtube, YouTube, "Morphing Identity: A real-time face morphing system to transforming face identity." May 15, 2021, Cybernetic Humanity Studio. https://youtu.be/ahKxwaJ3k_U?si=kp4G4wFa8IAsGNLY 2021.

Zhang, Erhu, et al. "Forgery Detection for Perforated No. in Security Document by Analysing the Perforated Holes." The Imaging Science Journal 65.1 (2017): 40-48. Web. 2017.

Zhao, Jian et al. "2018 Ieee/Cvf Conference on Computer Vision and Pattern Recognition." Towards Pose Invariant Face Recognition in the Wild IEEE 2018 pp. 2207-2216. 2018.

PCT International Search Report and Written Opinion; Application No. PCT/US23/79511 Jumio Corporation, International filing date of Nov. 13, 2023, date of mailing Mar. 4, 2024, 13 pages.

PCT International Search Report and Written Opinion; Application No. PCT/US23/79821 Jumio Corporation, International filing date of Nov. 15, 2023, date of mailing Apr. 4, 2024, 10 pages.

PCT International Search Report and Written Opinion; Application No. PCT/US23/86219 Jumio Corporation, International filing date of Dec. 28, 2023, date of mailing May 23, 2024, 4 pages.

Huang, Jing, et al. "A multiplexed network for end-to-end, multilingual OCR." Proceedings of the IEEE/CVF conference on computer vision and pattern recognition. 2021. (Year: 2021).

Nguyen, Thi Tuyet Hai, et al. "Neural machine translation with BERT forpost-OCR error detection and correction." Proceedings of the ACM/IEEE joint conference on digital libraries in 2020. 2020. (Year: 2020).

* cited by examiner

200

206

Processor
202

Communication Unit
208

114/
116

Display Device
210

Memory
204

Mini-Graph Based Fraud
Detector
226

Transaction Parts
Database
242

1100

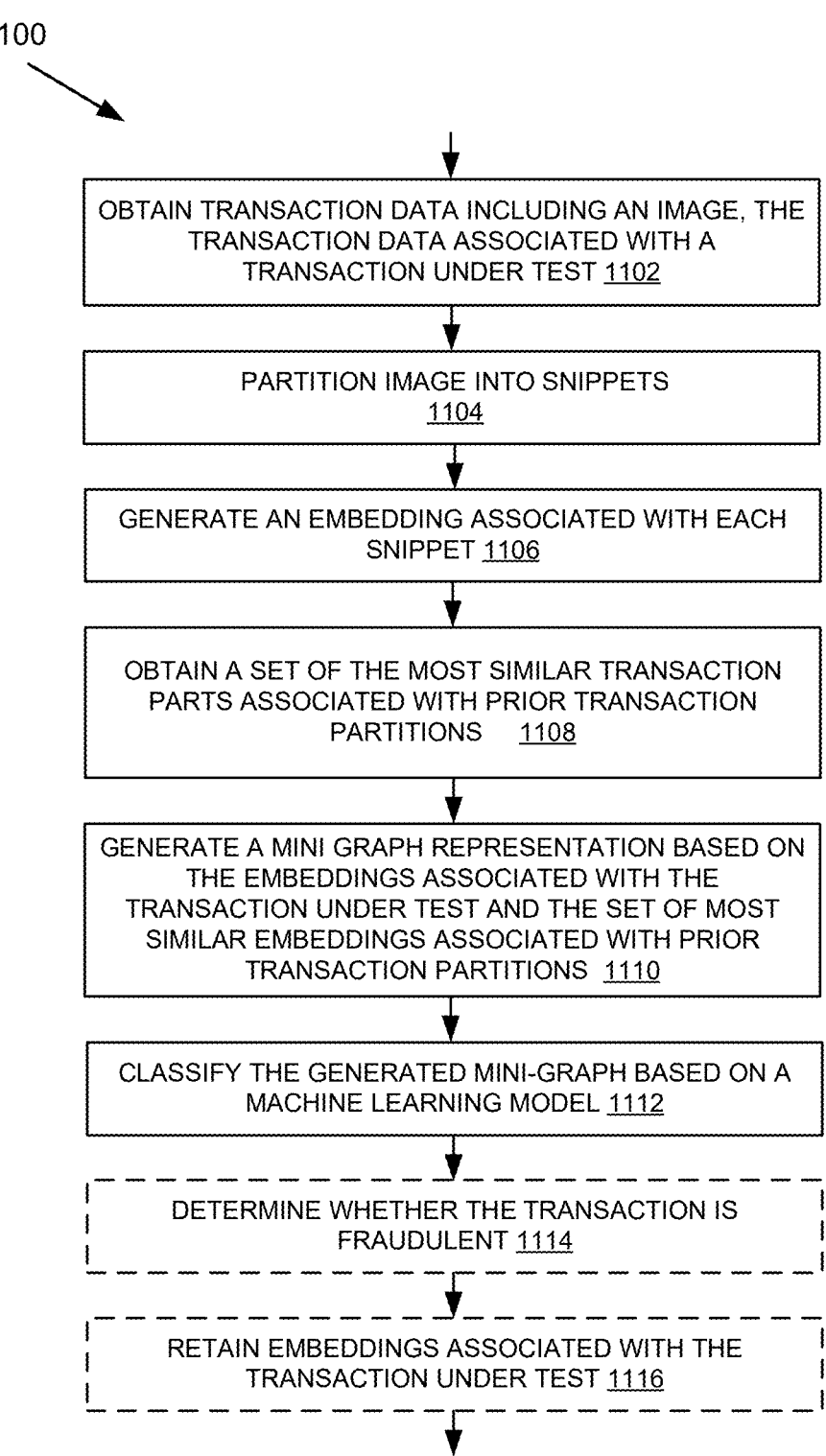

OBTAIN TRANSACTION DATA INCLUDING AN IMAGE, THE TRANSACTION DATA ASSOCIATED WITH A TRANSACTION UNDER TEST 1102

PARTITION IMAGE INTO SNIPPETS 1104

GENERATE AN EMBEDDING ASSOCIATED WITH EACH SNIPPET 1106

OBTAIN A SET OF THE MOST SIMILAR TRANSACTION PARTS ASSOCIATED WITH PRIOR TRANSACTION PARTITIONS     1108

GENERATE A MINI GRAPH REPRESENTATION BASED ON THE EMBEDDINGS ASSOCIATED WITH THE TRANSACTION UNDER TEST AND THE SET OF MOST SIMILAR EMBEDDINGS ASSOCIATED WITH PRIOR TRANSACTION PARTITIONS  1110

CLASSIFY THE GENERATED MINI-GRAPH BASED ON A MACHINE LEARNING MODEL 1112

DETERMINE WHETHER THE TRANSACTION IS FRAUDULENT 1114

RETAIN EMBEDDINGS ASSOCIATED WITH THE TRANSACTION UNDER TEST 1116

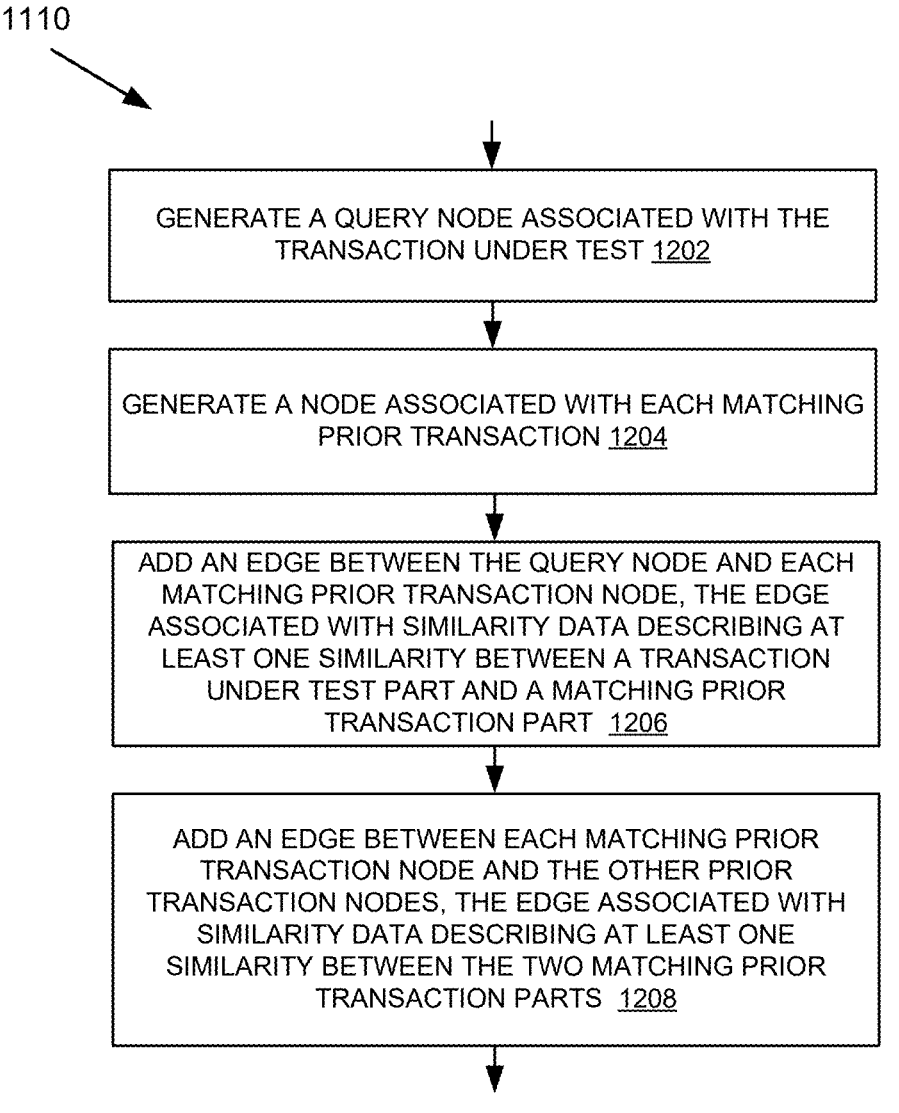

GENERATE A QUERY NODE ASSOCIATED WITH THE TRANSACTION UNDER TEST 1202

GENERATE A NODE ASSOCIATED WITH EACH MATCHING PRIOR TRANSACTION 1204

ADD AN EDGE BETWEEN THE QUERY NODE AND EACH MATCHING PRIOR TRANSACTION NODE, THE EDGE ASSOCIATED WITH SIMILARITY DATA DESCRIBING AT LEAST ONE SIMILARITY BETWEEN A TRANSACTION UNDER TEST PART AND A MATCHING PRIOR TRANSACTION PART  1206

ADD AN EDGE BETWEEN EACH MATCHING PRIOR TRANSACTION NODE AND THE OTHER PRIOR TRANSACTION NODES, THE EDGE ASSOCIATED WITH SIMILARITY DATA DESCRIBING AT LEAST ONE SIMILARITY BETWEEN THE TWO MATCHING PRIOR TRANSACTION PARTS  1208

OBTAIN CLASSIFICATION OF THE MINI-GRAPH
1302

OBTAIN OTHER AUTHENTICATION DETERMINATION
SIGNAL DATA ASSOCIATED WITH THE TRANSACTION
UNDER TEST  1304

DETERMINE WHETHER THE TRANSACTION IS
FRAUDULENT BASED ON THE GRAPH CLASSIFICATION
AND OTHER AUTHENTICATION DETERMINATION SIGNAL
DATA 1306

DETERMINE AN ACTION 1308

MINI-GRAPH BASED FRAUD DETECTION

BACKGROUND

The present disclosure relates to verification. More specifically, the present disclosure relates to transaction verification based on generation and use of a mini-graph.

Transactions are increasingly electronic and remote. The number of transactions occurring, e.g., electronic financial transactions, is generally increasing. These transactions may have significant, financial, legal, or safety implications.

SUMMARY

This specification relates to methods and systems for obtaining, using one or more processors, transaction data associated with a transaction under test, the transaction data including image data associated with a first image; generating, using the one or more processors, a set of transaction parts, the set of transaction parts including a first transaction part and a second transaction part, the first transaction part associated with a first image snippet, the first image snippet associated with a first portion of the first image; generating, using the one or more processors, a first embedding, where the first embedding is based on the first image snippet; obtaining, using the one or more processors, via a first search of prior transaction parts, a first result set, the first result set may include a first set of embeddings associated with a first set of prior transactions, and the first set of prior transactions may include prior transactions associated with embeddings of the first portion that are most similar to the first embedding associated with the transaction under test; obtaining, using the one or more processors, via a second search of prior transaction parts, a second result set, the second result set based on a second transaction part, the second result set associated with a second set of prior transactions, the second set of prior transactions may include transactions associated with second transaction parts most similar to the second transaction part associated with the transaction under test; generating, using the one or more processors, a mini-graph associated with the transaction under test, where the mini-graph associated with the transaction under test is based on the transaction under test, the first set of transactions, the second set of transactions, the first transaction part, and the second transaction part; and classifying, using the one or more processors and using a first machine learning model, whether the mini-graph associated with the transaction under test is indicative of fraud.

Other implementations of one or more of these aspects include corresponding systems, apparatus, and computer programs, configured to perform the actions of the methods, encoded on computer storage devices.

These and other implementations may each optionally include one or more of the following features. For instance, the features include that the first image represents a human face, and where the first image includes at least one of a selfie and an image of an identification document. The first image represents and identification document, where the first portion is a first portion of an identification document, and where the first portion of the identification document includes one or more of a document holder image, a security feature, a field name, and a field value. The first embedding includes a vector embedding. The second transaction part includes at least one of a second image snippet associated with a second portion of the first image, and text extracted from the first image. Generating the mini-graph associated with the transaction under test may include: generating a set of nodes, where a node is generated for: the transaction under test, each transaction may include the first set of transactions, and each transaction may include the second set of transactions; and generating a plurality of edges, where each edge: connects between two nodes, where the two nodes include: a first node associated with the transaction under test and a second node that is associated with a prior transaction, or two nodes associated with prior transactions from one or more of the first set of prior transactions and the second set of prior transactions; and is associated with a similarity of a particular transaction part between the two transactions associated with the two nodes. For instance, the features may include: training the first machine learning model using a tree-based approach based on features describing labeled mini-graphs associated with prior transactions. For instance, the features may include: training the first machine learning model using a graphical neural network using mini-graphs associated with labeled prior transactions directly as training data. The decision is one or more of confirmatory of the classification of the mini-graph using the first machine learning model and used as a label for subsequent training. For instance, the features may include: indexing prior transaction parts data using one or more of hierarchical navigable small world and k-means clustering.

The features and advantages described herein are not all-inclusive and many additional features and advantages will be apparent in view of the figures and description. Moreover, it should be noted that the language used in the specification has been principally selected for readability and instructional purposes and not to limit the scope of the techniques described.

BRIEF DESCRIPTION OF THE DRAWINGS

The disclosure is illustrated by way of example, and not by way of limitation in the figures of the accompanying drawings in which like reference numerals are used to refer to similar elements.

FIG. 11 is a flowchart of an example method for mini-graph based fraud detection in accordance with some implementations.

FIG. 12 is a flowchart of an example method for generating a mini-graph in accordance with some implementations.

Figure 13:
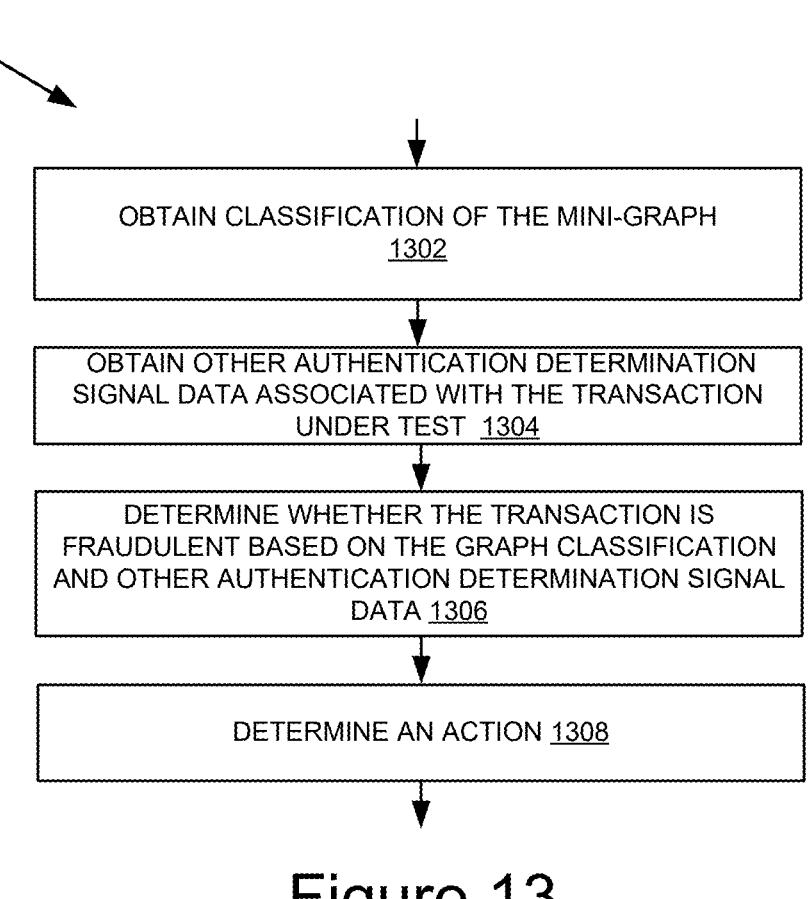

FIG. 13 is a flowchart of an example method for combining a graph classification with other fraud signal data in accordance with some implementations.

DETAILED DESCRIPTION

The present disclosure is described in the context of an example document evaluator and use cases; however, those skilled in the art should recognize that the document evaluator may be applied to other environments and use cases without departing from the disclosure herein.

Transactions are increasingly performed electronically and remotely. This creates the challenge of authenticating the transaction. For example, authenticating that a party to the transaction is in fact who he/she purports to be and not some nefarious user seeking to commit fraud.

Documents are provided in one or more contexts. For example, documents may be provided to prove a person's age or identity, as is the case with identification documents, as proof ownership, as is the case with documents such as title documents, as proof of authenticity (e.g., a certificate of authenticity), etc.

A user may also have to provide a video or still image of himself/herself, occasionally referred to herein as a "selfie," in one or more contexts. For example, a selfie may be used for comparison to the document image to determine whether the individual initiating the transaction (submitting the document) is the individual to whom the document was issued. As another example, the selfie may establish that the individual submitting the selfie is live and/or present.

These contexts may have significant, financial, legal, or safety implications. For example, documents may be provided to confirm an identity of a user prior to a financial transaction. If fraudulent transactions are accepted, identity theft, circumvention of sanctions, watchlists, or anti-money laundering mechanisms may occur. Accordingly, it may be desirable to verify/authenticate a transaction before executing the transaction.

Fraudsters may leverage technology to automate a series of repeated, fraudulent attempts to mislead an entity until a successful vector of attack is discovered, and their attacks may become increasingly more sophisticated (e.g., using photo editing software, such as Photoshop to modify images of valid documents to create fake/invalid documents, such as fake IDs, to use facial morphing to modify, in real-time, their facial features in a selfie or video to more closely resemble the face in an image of a valid document, etc.). The mini-graph based fraud detector 226 described herein may beneficially detect such fraudulent attempts in transactions.

In some implementations, the mini-graph based fraud detection described herein may beneficially provide one or more of detection of fraud despite usage of sophisticated methods (e.g., photo editing, face morphs, deep fakes, etc.), efficient detection at scale (e.g., by using embeddings and generating mini-graphs, computer resource utilization may be reduced and a large number of electronic transactions may be processed, processed timely, and processed at a lower cost both computationally and financially).

Figure 1:
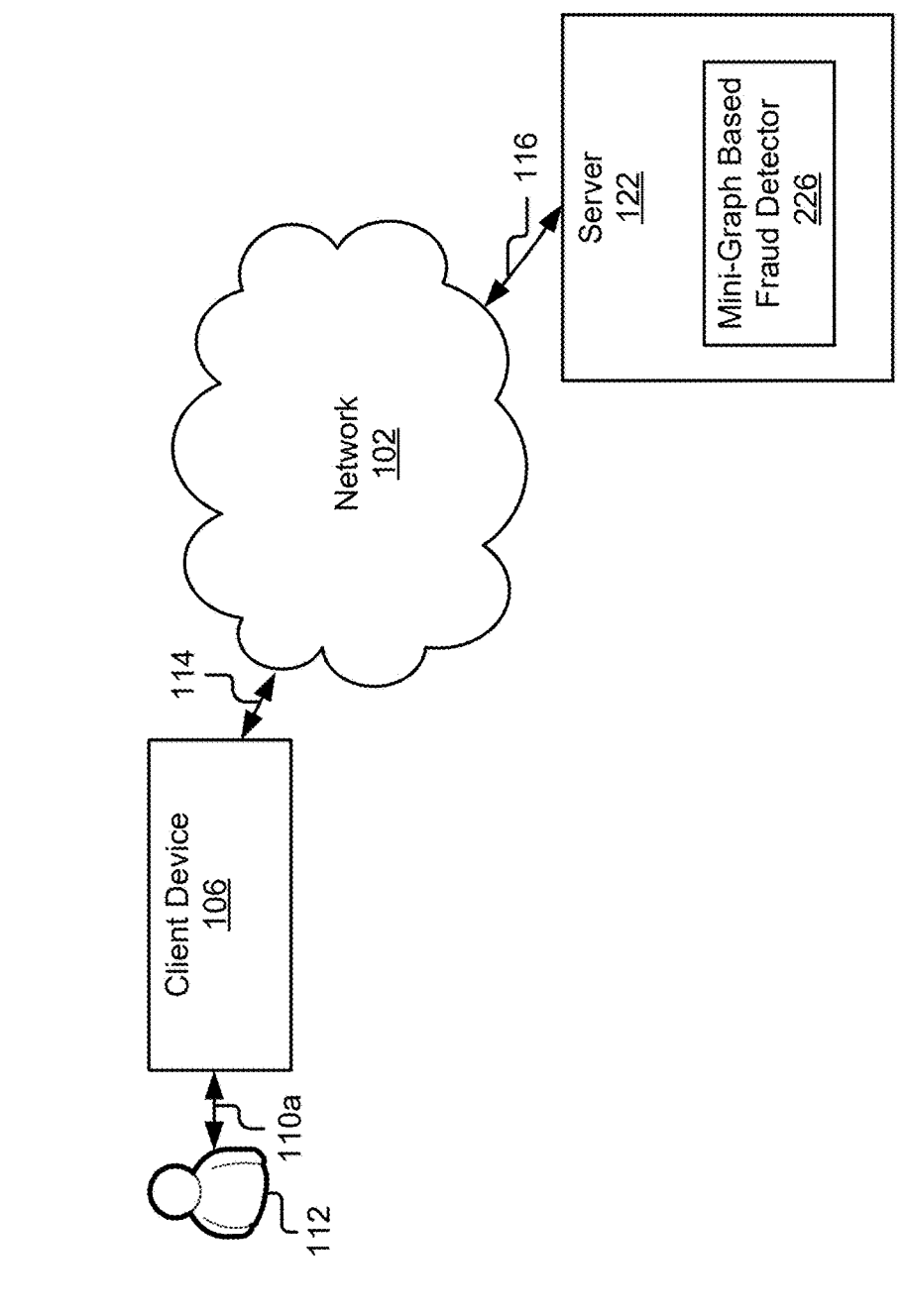
FIG. 1 is a block diagram of one example implementation of a system for mini-graph based fraud detection in accordance with some implementations.

FIG. 1 is a block diagram of an example system 100 for mini-graph based fraud detection in accordance with some implementations. As depicted, the system 100 includes a server 122 and a client device 106 coupled for electronic communication via a network 102.

The client device 106 is a computing device that includes a processor, a memory, and network communication capabilities (e.g., a communication unit). The client device 106 is coupled for electronic communication to the network 102 as illustrated by signal line 114. In some implementations, the client device 106 may send and receive data to and from other entities of the system 100 (e.g., a server 122). Examples of client devices 106 may include, but are not limited to, mobile phones (e.g., feature phones, smart phones, etc.), tablets, laptops, desktops, netbooks, portable media players, personal digital assistants, etc.

Although a single client device 106 is shown in FIG. 1, it should be understood that there may be any number of client devices 106. The system 100 depicted in FIG. 1 is provided by way of example and the system 100 and/or further systems contemplated by this present disclosure may include additional and/or fewer components, may combine components and/or divide one or more of the components into additional components, etc. For example, the system 100 may include any number of client devices 106, networks 102, or servers 122. In some implementations, the system 100 may include a third-party server (not shown). For example, in some implementations, the third-party server (not shown) may request authentication of the transaction and perform or decline the transaction based on an outcome of the mini-graph based fraud detection.

The network 102 may be a conventional type, wired and/or wireless, and may have numerous different configurations including a star configuration, token ring configuration, or other configurations. For example, the network 102 may include one or more local area networks (LAN), wide area networks (WAN) (e.g., the Internet), personal area networks (PAN), public networks, private networks, virtual networks, virtual private networks, peer-to-peer networks, near field networks (e.g., Bluetooth®, NFC, etc.), cellular (e.g., 4G or 5G), and/or other interconnected data paths across which multiple devices may communicate.

The server 122 is a computing device that includes a hardware and/or virtual server that includes a processor, a memory, and network communication capabilities (e.g., a communication unit). The server 122 may be communicatively coupled to the network 102, as indicated by signal line 116. In some implementations, the server 122 may send and receive data to and from other entities of the system 100 (e.g., one or more client devices 106).

Other variations and/or combinations are also possible and contemplated. It should be understood that the system 100 illustrated in FIG. 1 is representative of an example system and that a variety of different system environments and configurations are contemplated and are within the scope of the present disclosure. For example, various acts and/or functionality described herein may be moved from a server to a client, or vice versa, data may be consolidated into a single data store or further segmented into additional data stores, and some implementations may include additional or fewer computing devices, services, and/or networks, and may implement various functionality client or server-side. Furthermore, various entities of the system may be integrated into a single computing device or system or divided into additional computing devices or systems, etc.

For example, as depicted, the server 122 include an instance of the mini-graph based fraud detector 226. However, in some implementations, the components and functionality of the mini-graph based fraud detector 226 may be entirely client-side (e.g., at client device 106; not shown), entirely server side (i.e., at server 122, as shown), or divide among the client device 106 and server 122 (not shown).

Figure 2:
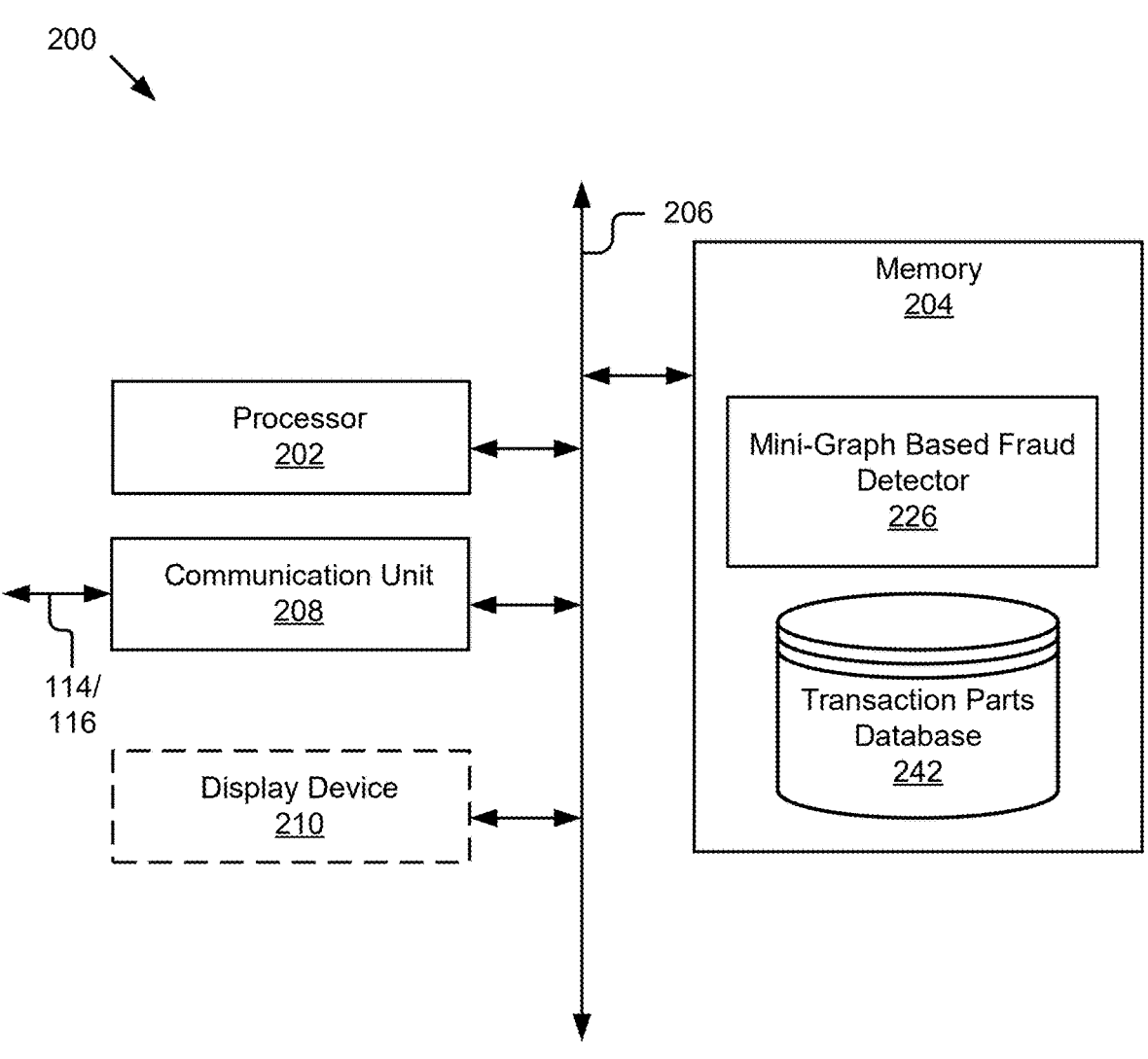
FIG. 2 is a block diagram of an example computing device in accordance with some implementations.

FIG. 2 is a block diagram of an example computing device 200 including an instance of the mini-graph based fraud detector 226 and a transaction parts database 242. In the illustrated example, the computing device 200 includes a processor 202, a memory 204, a communication unit 208, and an optional display device 210. In some implementations, the computing device 200 is a server 122, the memory 204 stores the mini-graph based fraud detector 226, and the communication unit 208 is communicatively coupled to the network 102 via signal line 116. In some implementations, the computing device 200 is a client device 106, which may occasionally be referred to herein as a user device, and the client device 106 optionally includes at least one sensor (not shown), and the communication unit 208 is communicatively coupled to the network 102 via signal line 114.

The processor 202 may execute software instructions by performing various input/output, logical, and/or mathematical operations. The processor 202 may have various computing architectures to process data signals including, for example, a complex instruction set computer (CISC) architecture, a reduced instruction set computer (RISC) architecture, and/or an architecture implementing a combination of instruction sets. The processor 202 may be physical and/or virtual and may include a single processing unit or a plurality of processing units and/or cores. In some implementations, the processor 202 may be capable of generating and providing electronic display signals to a display device, supporting the display of images, capturing and transmitting images, and performing complex tasks and determinations. In some implementations, the processor 202 may be coupled to the memory 204 via the bus 206 to access data and instructions therefrom and store data therein. The bus 206 may couple the processor 202 to the other components of the computing device 200 including, for example, the memory 204, the communication unit 208, etc.

The memory 204 may store and provide access to data for the other components of the computing device. The memory 204 may be included in a single computing device or distributed among a plurality of computing devices. In some implementations, the memory 204 may store instructions and/or data that may be executed by the processor 202. The instructions and/or data may include code for performing the techniques described herein. For example, in one implementation, the memory 204 may store an instance of the mini-graph based fraud detector 226. The memory 204 is also capable of storing other instructions and data, including, for example, an operating system, hardware drivers, other software applications, databases, etc. The memory 204 may be coupled to the bus 206 for communication with the processor 202 and the other components of the computing device 200.

The memory 204 may include one or more non-transitory computer-usable (e.g., readable, writeable) device, a static random access memory (SRAM) device, a dynamic random access memory (DRAM) device, an embedded memory device, a discrete memory device (e.g., a PROM, FPROM, ROM), a hard disk drive, an optical disk drive (CD, DVD, Blu-ray™, etc.) mediums, which can be any tangible apparatus or device that can contain, store, communicate, or transport instructions, data, computer programs, software, code, routines, etc., for processing by or in connection with the processor 202. In some implementations, the memory 204 may include one or more of volatile memory and non-volatile memory. It should be understood that the memory 204 may be a single device or may include multiple types of devices and configurations. In some implementations, the memory 204 stores a document database 242. In some implementations, the transaction parts database 242 is stored on a portion of the memory 204 comprising a network accessible storage device.

The communication unit 208 is hardware for receiving and transmitting data by linking the processor 202 to the network 102 and other processing systems. The communication unit 208 receives data and transmits the data via the network 102. The communication unit 208 is coupled to the bus 206. In one implementation, the communication unit 208 may include a port for direct physical connection to the network 102 or to another communication channel. For example, the computing device 200 may be the server 122, and the communication unit 208 may include an RJ45 port or similar port for wired communication with the network 102. In another implementation, the communication unit 208 may include a wireless transceiver (not shown) for exchanging data with the network 102 or any other communication channel using one or more wireless communication methods, such as IEEE 802.11, IEEE 802.16, Bluetooth® or another suitable wireless communication method.

In yet another implementation, the communication unit 208 may include a cellular communications transceiver for sending and receiving data over a cellular communications network such as via short messaging service (SMS), multimedia messaging service (MMS), hypertext transfer protocol (HTTP), direct data connection, WAP, e-mail or another suitable type of electronic communication. In still another implementation, the communication unit 208 may include a wired port and a wireless transceiver. The communication unit 208 also provides other connections to the network 102 for distribution of files and/or media objects using standard network protocols such as TCP/IP, HTTP, HTTPS, and SMTP as will be understood to those skilled in the art.

The display device 218 is a conventional type such as a liquid crystal display (LCD), light emitting diode (LED), touchscreen, or any other similarly equipped display device, screen, or monitor. The display 218 represents any device equipped to display electronic images and data as described herein. In some implementations, the display device 218 is optional and may be omitted.

It should be apparent to one skilled in the art that other processors, operating systems, inputs (e.g., keyboard, mouse, one or more sensors, etc.), outputs (e.g., a speaker, display, haptic motor, etc.), and physical configurations are possible and within the scope of the disclosure.

In some implementations, the mini-graph based fraud detector 226 provides the features and functionalities described below responsive to a request. For example, a request on behalf of an entity (not shown) to evaluate whether a transaction is fraudulent or likely to be fraudulent. In some implementations, the evaluation of the mini-graph determines whether the transaction is accepted (e.g., determined to be authentic or non-fraudulent) or rejected (e.g., fraudulent, inauthentic, etc.).

Figure 3:
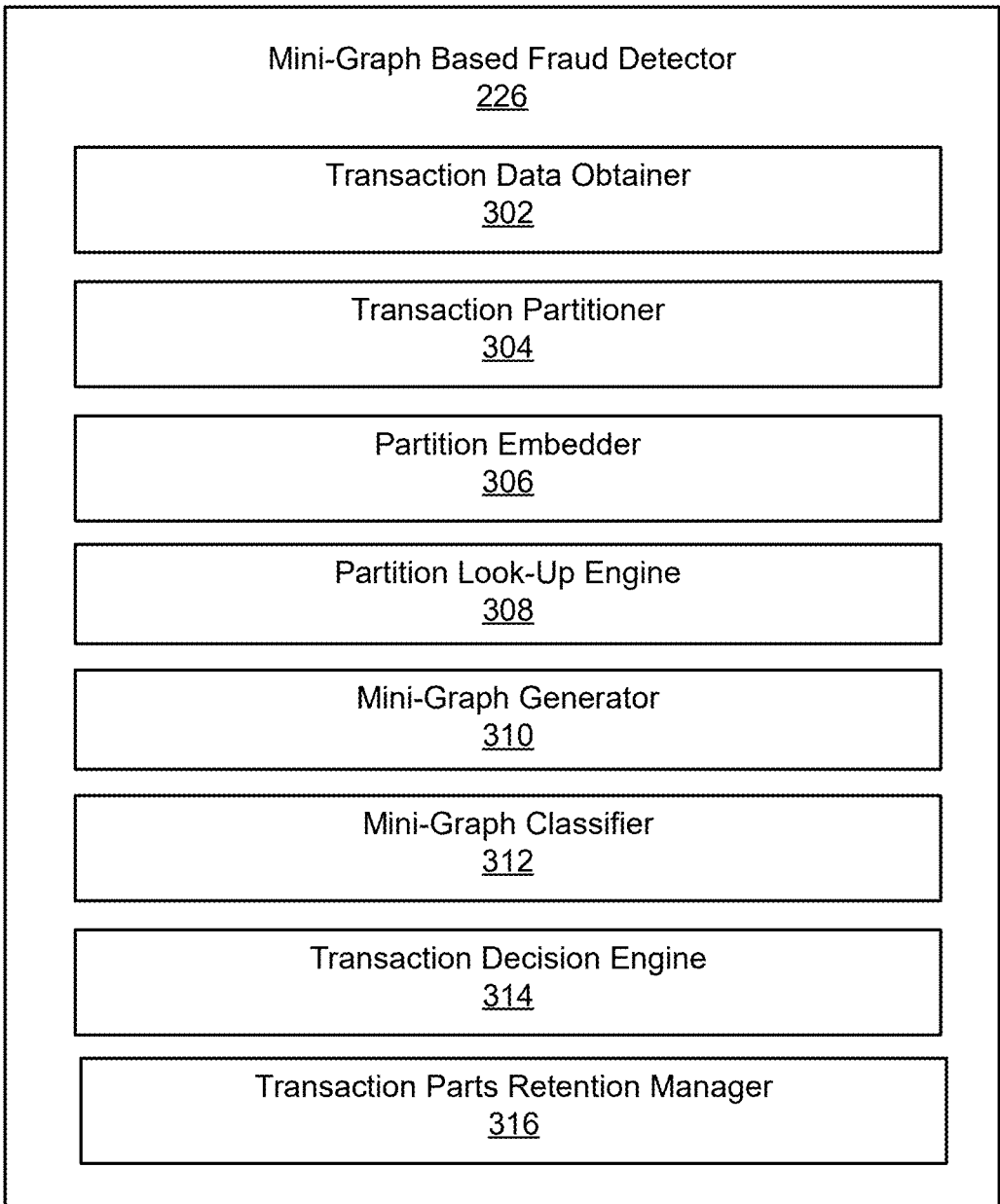
FIG. 3 is a block diagram of an example mini-graph based fraud detector in accordance with some implementations.

Referring now to FIG. 3, a block diagram of an example mini-graph based fraud detector 226 is illustrated in accordance with some implementations. As illustrated in FIG. 3, in some implementations, the mini-graph based fraud detector 226 may include a transaction data obtainer 302, a transaction partitioner 304, a partition embedder 306, a partition look-up engine 308, a mini-graph generator, a mini-graph classifier 310, a transaction decision engine 312, and a transaction parts retention manager 314. The components 302, 304, 306, 308, 310, 312, and 314, subcomponents, sub-subcomponents, etc. thereof are communicatively coupled to one another and/or to the transaction parts database 242 to perform the features and functionalities described herein.

In some implementations, the transaction obtainer 302 obtains transaction data associated with a transaction under test. As used herein, a transaction under test is a transaction which the mini-graph based fraud detector 226 is to determine as fraudulent (or likely fraudulent) or not fraudulent (or not likely to be fraudulent. The transaction under test may also be referred to occasionally as the query.

The transaction may vary depending on the implementation and use case. For clarity and convenience, the description herein may frequently refer to examples where the transaction is associated with one or more images, such as a facial image (e.g., a selfie image or video) and/or an image of a document (e.g., a government issued ID with an image of the document holder). Examples of such transactions may be account creation (e.g., where a bank or financial institution wants to identify the identity of a would-be customer to comply with regulations related to anti-money laundering and knowing your customer), mobile deposit of a check (e.g., where an image of the document is an image of check for mobile deposit), etc. However, it should be recognized that these examples have been selected for clarity and convenience and other transactions, documents, images, etc. are contemplated and within the scope of this disclosure.

The transaction data may vary based on the implementation and use case. In some implementations, the transaction data includes image data. The image data may be associated with a video or still image. For example, the image data may include a selfie purportedly taken by the user represented in the image and purportedly with a camera on the client device 106 and/or an image of an identification or other document.

In some implementations, the transaction data includes other transaction data, i.e., data other than image data that is associated with or descriptive of the transaction. Examples of other transaction data may include but are not limited to entity information, user device information, location information, other source information, etc. Examples of entity information may include, but is not limited to one or more of an identifier of the entity associated with the request (e.g., the name or username of the user, the name of the bank requesting authentication of the transaction, an account number, etc.), a source type identifier (e.g., merchant, bank, individual), or other information associated with the entity requesting authentication (e.g., a bank) and/or an entity involved in the transaction (e.g., a user requesting a new account).

Examples of user device information may include, but are not limited to, one or more of a MAC address, electronic serial number, make and model, operating system, software version, or other identifier information associated with a client device (e.g., associated with the mobile phone of the user initiating the transaction). Examples of location information may include, but are not limited to, one or more of a network location (e.g., an IP address) or a physical location (e.g., GPS coordinates, physical location associated with an IP address, etc.), etc. Examples of other source information may include, but are not limited to, a transaction channel (e.g., whether the transaction is initiated through a mobile app., an API, or browser-based website), a fraud risk categorization regarding whether a location of the transaction or the type of transaction is associated with, e.g., an increased or lower incidence of fraud, etc.

Depending on the implementation, the transaction data may be received from a user (e.g. from a bank customer interacting with his/her mobile phone, i.e., an example of a client device), from a third-party (e.g., form a third-party server (not shown) on behalf of a bank or other service seeking confirm the legitimacy of a transaction), or other data sources (e.g., a mapping of IP addresses to geographic regions, a list of fraud hot spots, etc.).

The transaction data obtainer 302 is communicatively coupled with other components of the mini-graph based fraud detector 226 (or components thereof) to provide the obtained transaction data, or portions thereof, thereto. In some implementations, the transaction data obtainer 302 may store the transaction data in the memory 204 (or other data storage) for retrieval. In some implementations, the transaction data obtainer 302 may send the transaction data to one or more other components of the mini-graph based fraud detector 226 (or components thereof). For example, in some implementations, the transaction data obtainer 302 may provide transaction data such as image data to the transaction partitioner 304.

In some implementations, the transaction partitioner 304 determines a set of transaction parts. An example transaction partitioner 304 is discussed further, below, with reference to FIG. 4 in accordance with some implementations. In some implementations, the transaction partitioner 304 determines a set of those transaction parts that are used by or incorporated into the mini-graph generated by mini-graph generator 310, which is discussed below. For example, in some implementations, the transaction parts determined by the transaction partitioner 304 may be used as a basis for a search for similar transaction parts associated with one or more prior transactions and the result sets from those various searches, performed by the partition look-up engine 308 discussed below, may be used by the mini-graph generator 310 to generate a mini-graph associated with the transaction under test. In some implementations, the transaction parts determined by the transaction partitioner 304 may be used by the graph classifier 310 to determine whether the mini-graph is indicative of fraud.

Figure 4:
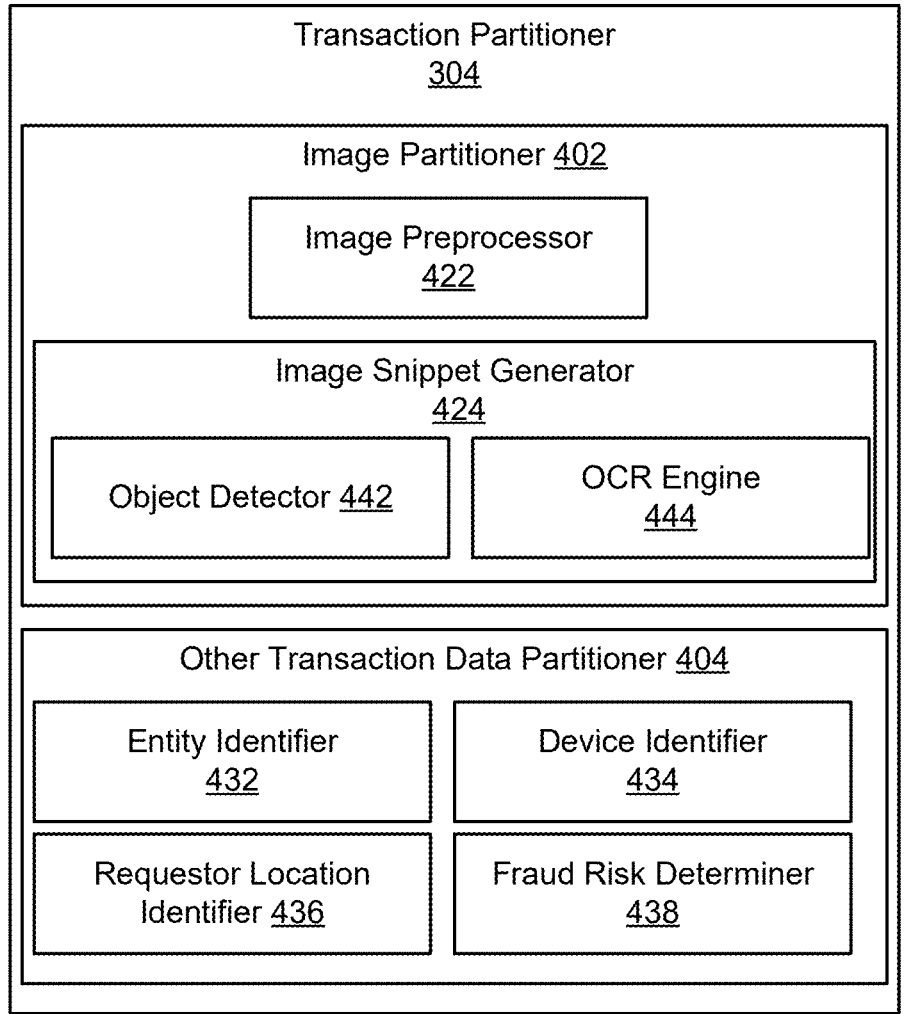
FIG. 4 is a block diagram of an example document partitioner in accordance with some implementations.

Referring now to FIG. 4, a block diagram of an example transaction partitioner 402 is illustrated in accordance with some implementations. As illustrated in FIG. 4, in some implementations, the transaction partitioner 304 includes an image partitioner 402 and the other data partitioner 404. In some implementations, the image partitioner 402 may include an image preprocessor 422, an OCR engine 424, an object detector 424, and an image snippet generator 428.

In some implementations, the image preprocessor 422 receives one or more images associated with a transaction and pre-processes one or more of the images. The preprocessing may vary based on the implementation, use case, or image subject. For example, the preprocessing of a document image by the image preprocessor 422 may vary from preprocessing applied to a selfie image or video by the image preprocessor 422.

Examples of preprocessing performed by the image preprocessor 422 may include, but are not limited to, one or more of subject extraction, rectification, composite image generation, edge detection, etc. In some implementations, the image preprocessor 422 may extract the portion of the image depicting the subject (e.g., the document or person from the background or surrounding environment). In some implementations, the image preprocessor 422 may rectify the image data, or a portion thereof, by performing one or more of a rotation, a translation, and a de-skew. For example, in some implementations, the image preprocessor 422 determines the polygon associated with a document portion within the image and rotates and de-skews the polygon, e.g., to generate a normalized, rectangular representation of the document.

In some implementations, the image preprocessor 422 may receive multiple images of the same document instance (e.g., multiple frames from a video clip recording an identification document) and generate a composite image based on the multiple images. For example, some documents, such as government issued identification documents, may have optically dynamic security features such as color shifting ink, hologram, kinegrams, etc., which may not be represented in a single image. In some implementations, the image preprocessor 422 may make a composite document image that represents the optically dynamic security feature, when present, so that the mini-graph based fraud detector 226 may use those optically dynamic security features, or their absence, in the evaluation.

In some implementations, the image preprocessor 422 may perform edge detection and convert the image or a portion thereof into the edge domain. In some implementations, the image preprocessor 422 convert an image or portion thereof into another domain (e.g., the frequency domain).

The image snippet generator 424 generates one or more image snippets, where an image snippet represents, or is associated with, a portion of the image (e.g., post processing) associated with the transaction under test. The number and type of image snippets generated by the image may vary depending on a number of factors including, but not limited to the implementation, use case, transaction, transaction type, image subject (e.g., document or selfie), classification of the document in the image (e.g., type of document, issuer, version), features of the document (e.g., security features such as document holder image(s), watermarks, holograms, perforations, ghost images, microprint, fields, etc. associated with valid instances of the document, field values, etc.), etc.

Figure 5:
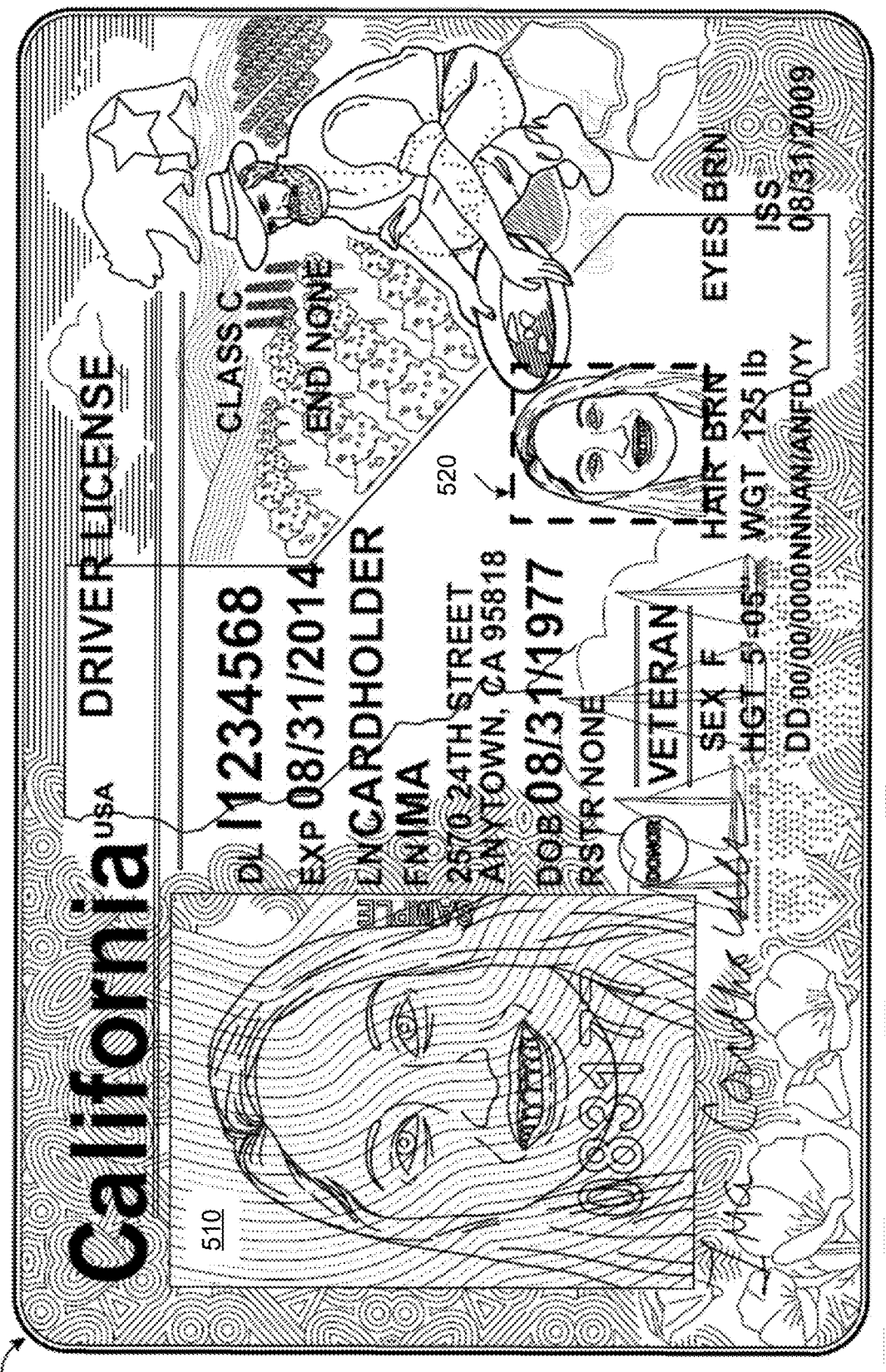
FIG. 5 is a representation an example of a California Driver's License image, which is an example of a document image in accordance with some implementations.

For clarity and convenience, the description herein makes repeated reference to a use case in which the transaction under test is associated with a government issued identification document, more specifically, the California Driver's License (CADL) 500 depicted in FIG. 5, sometimes referred to herein as the CADL example. However, other government identification documents are within the scope of this disclosure including, but not limited to, ID cards, voter cards, passports, driver's licenses, visas, etc. Additionally, it should be recognized that other documents exist and may be supported by the system 100. For example, financial documents (e.g., check, bearer bonds, stock certificates, bills, etc.) or other documents may be supported and evaluated by the system 100.

Furthermore, it should be recognized that image snippets may be generated from non-document images, such as selfies. In some implementations, the various snippets in a selfie may be associated with one or more of, the subject, the scene/background, the shape of the silhouette of the subject or a feature of the subject (outline of the subject's hair, torso, chest and neckline), objects in the scene/background, the scene, a mapping of key points of certain facial features (e.g., distance between the eyes and their distance to the mouth, etc., which may have been generated during preprocessing), etc. It should be recognized that the foregoing are merely examples of snippets that may be associated with a selfie image and others exist and may be used without departing from the description herein.

In some implementations, the image snippets generated by the image snippet generator 424 may be conditional based on a classification of the document, when a document is determined to be present in the image. Referring to FIG. 5, assume that the image preprocessor 422 may extract the document portion of an image associated with a transaction and perform rectification for a document image thereby producing the CADL 500 image represented in FIG. 5. A document classifier may identify the document (e.g., a CA Driver's License issued in 2009), and the image snippet generator 424 may generate one or more image snippets based on that classification.

In some implementations, the image snippet generator 424 generates a snippet using one or more of object detection and optical character recognition (OCR). In some implementations, as illustrated in the example transaction partitioner 304 of FIG. 4, the transaction partitioner 304 may include an object detector 442 and/or an OCR engine 444. In some implementations, the one or more snippets generated by the image snippet generator 424 may include at least one snippet based on a bounding box determined by the object detector 442 or the OCR engine 444. In some implementations, the one or more snippets generated by the image snippet generator 424 may include at least one snippet based on the contours of the content (e.g., the contours of the object or text) determined by the object detector 442 or the OCR engine 444, respectively.

It should be understood that, while text/characters may be detectable objects, this description generally refers separately to the detection of text and textual characters with reference to the OCR engine 306 and other objects (e.g., faces or portions thereof, silhouettes, document security features such as holograms, seals, watermarks, laser perforations; background objects, etc.) with reference to the object detection engine 308 for clarity and convenience.

Figure 8:
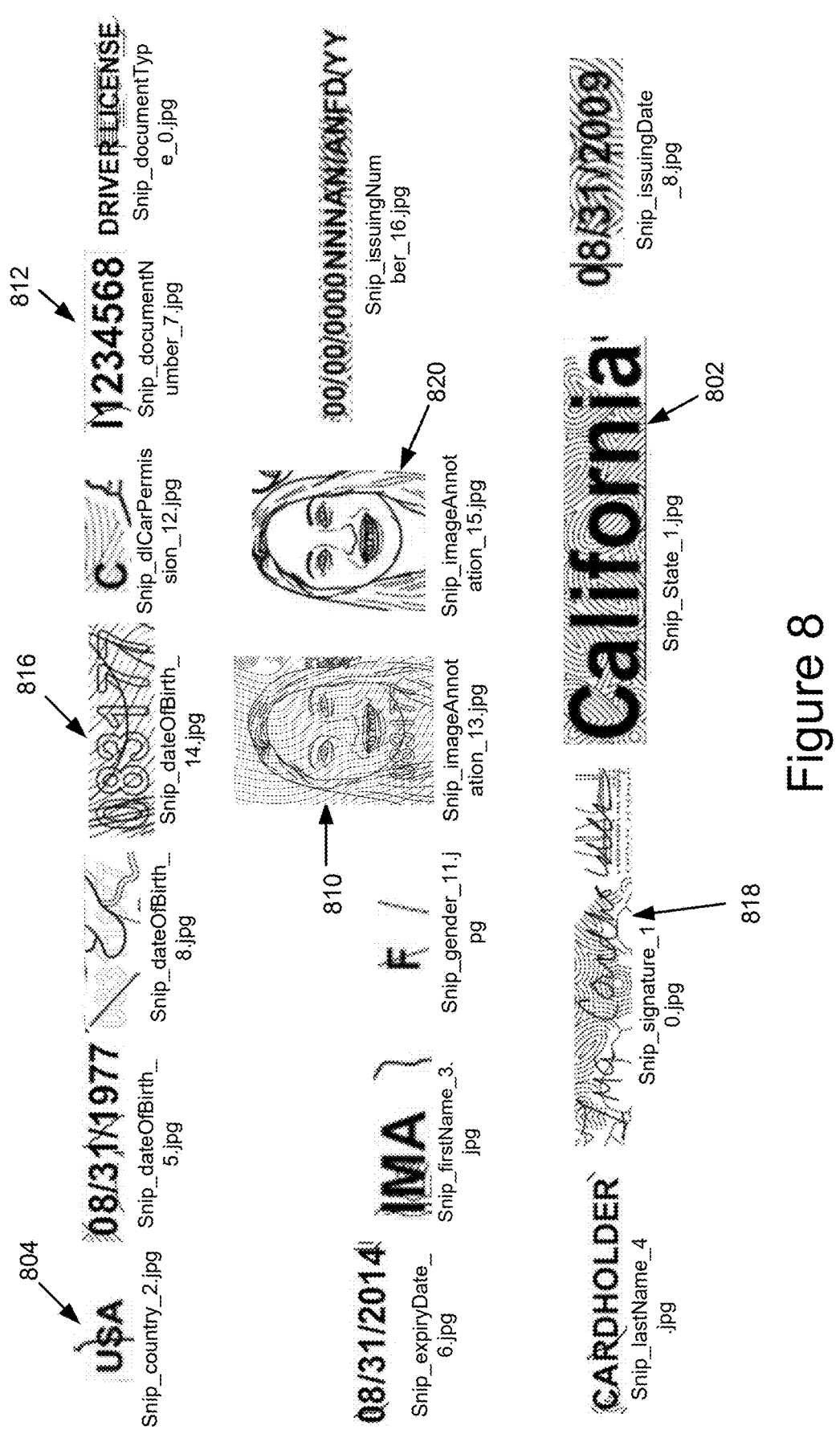
FIG. 8 illustrates example snippets derived from the example CADL in accordance with some implementations.

In some implementations, the object detection engine 442 detects one or more objects in an image. In some implementations, when the object detection engine 442 executes, the presence of an object is recognized in the input image and bounding box(es) are generated around the object(s). Examples of objects in the context of other images, such as selfies, may include, but are not limited to, one or more of the subject, the subject's hair, the outline of the subject and/or the subject's face, the subject's clothing, objects visible in the scene/background, etc. Examples of objects in the context of a document may include, but are not limited to, one or more of a hole punched in the document (often indicating that the document is expired or invalid), the overall shape of the document (e.g., a clipped bottom right corner may be used by the system 100 to quickly determine invalidity for certain jurisdictions/issuers), signatures, facial images, ghost images, holograms, watermarks, kinegrams, seals, symbols, laser perforations, etc. For example, referring to FIG. 5, in some implementations, the object detection engine 442 may detect the facial image 510 and ghost image 520, and generate bounding boxes associated with detected objects and enclosing/bounding those portions of the image. For example, the object detection engine 308 may generate bounding boxes such as those illustrated in FIG. 5 around the images 510 and 520 and may generate image snippets 810 and 820 based on the document holder image 510 and ghost image 520, respectively, as illustrated in FIG. 8.

In some implementations, the object detection engine 442 includes a segmentation engine (not shown) that segments an image into a plurality of segments and generates a snippet based on at least one segment of the image. Examples of segments include, but are not limited to, a portion of the image representing the subject (e.g., a person or a document), a portion of the image representing a background, which may also be referred to as a scene or surroundings, a sub-portion of the subject (e.g., a face, an outline of a person's head, a portion of the image representing a person's clothing, etc.), a portion of the background (e.g., an object in the background, its perimeter etc.). In some implementations, a segment may not be a box, such as a bounding box. For example, in some implementations, a segment's contours may trace, or approximate, the perimeter of the segment's content, e.g., the segment outlines a person's head, or an object in the background.

The OCR engine 444 converts text in an image into machine-readable text. In some implementations, when the OCR engine 444 executes, the presence of text is recognized in the input image (e.g., a post-processed image of a document image associated with a transaction under test) and bounding boxes are generated around that text. In some implementations, the OCR engine 444 may derive other information besides the bounding box and machine-readable text. For example, in some implementations, the OCR engine 444 may derive font characteristics including one or more of a font such as "Arial", font size such as 10 pt., font style such as bold, capitalization such as use of all caps or small caps, etc., font orientation such as horizontal or vertical, etc.

Figure 6:
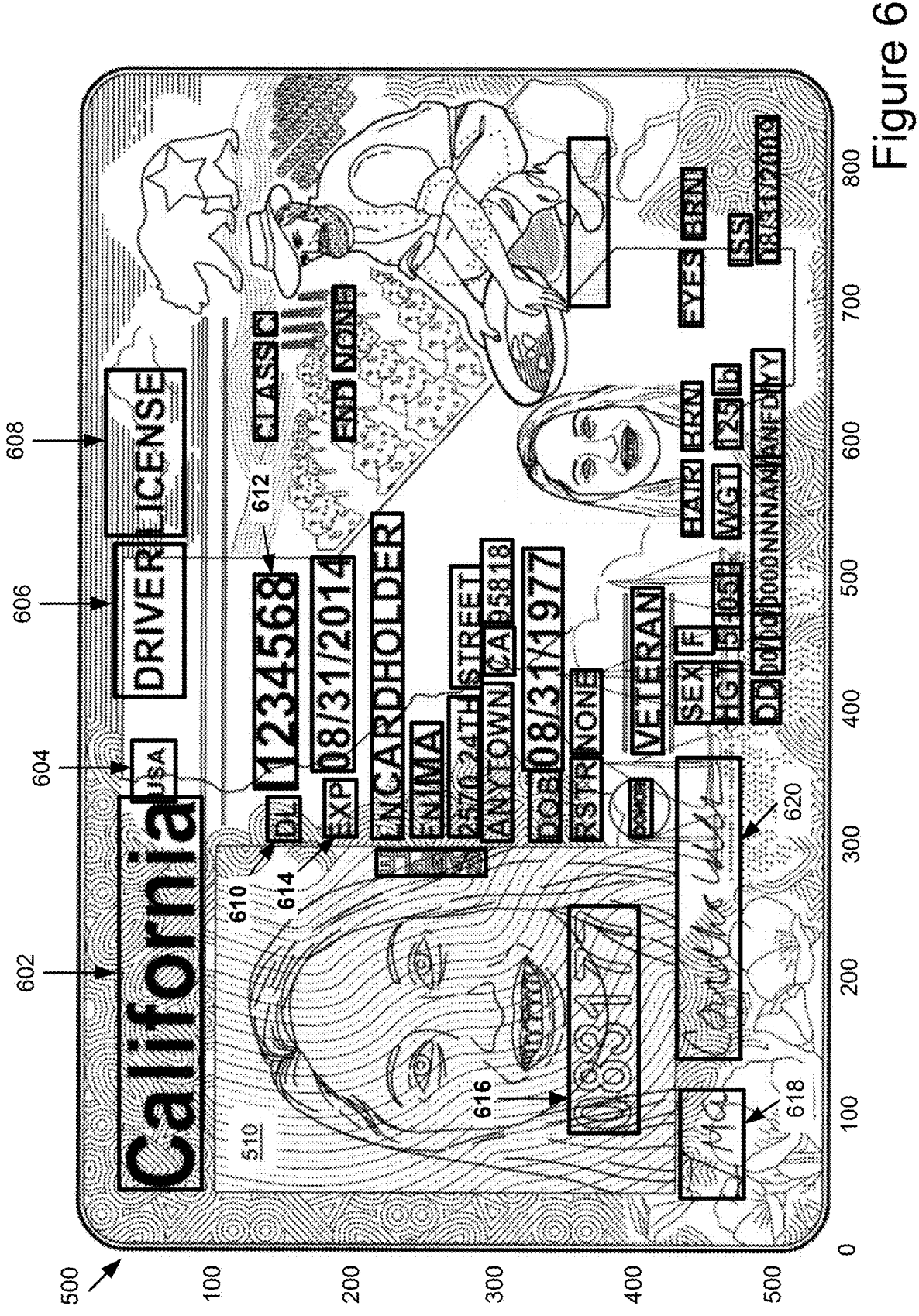
FIG. 6 is an image of the example California Driver's License (CADL) with examples of bounding boxes superimposed in accordance with some implementations.
Figure 7:
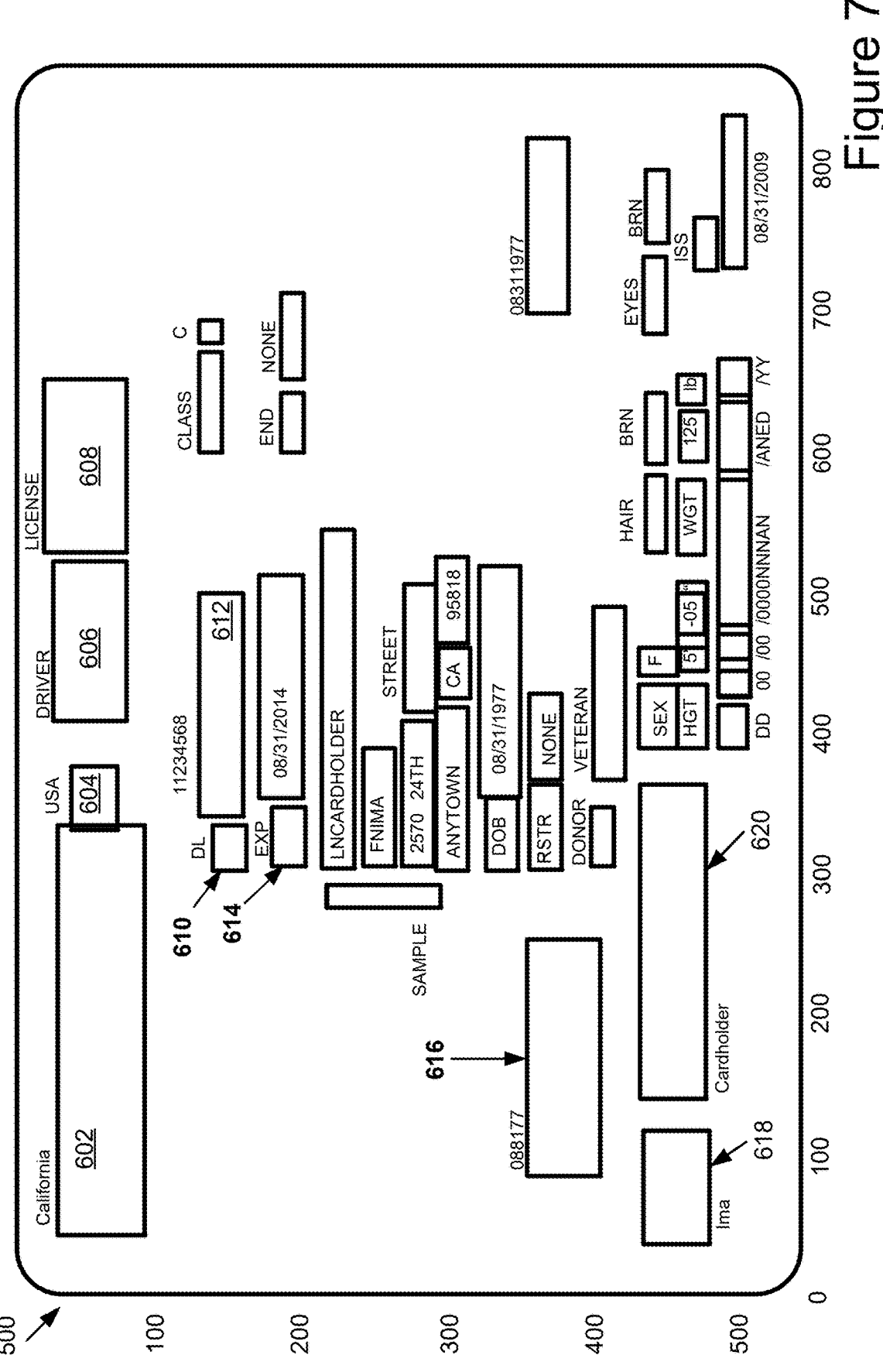
FIG. 7 is an example illustration of the bounding boxes without the example California Driver's License in accordance with some implementations.

Referring to FIG. 6, an example illustrating the CADL 500 of FIG. 5 with examples of bounding boxes superimposed in accordance with some implementations. In some implementations, the OCR engine 306 generates the illustrated bounding boxes including bounding boxes 602, 604, 606, 608, 610, 612, 614, 616, 618, and 620. Referring to FIG. 7, an example illustration of the bounding boxes shown in FIG. 6 is illustrated without the background of the CADL 500 example of FIG. 5 is shown in accordance with some implementations.

Referring to FIG. 8, an example of a set of image snippets generated by the image snippet generator 424 based on the object detection illustrated with reference to FIG. 5 and the OCR illustrated with reference to FIGS. 6 and 7 is illustrated. In FIG. 8, snippet 802 corresponds to the portion of the CADL 500 in bounding box 602 as illustrated in FIG. 6, snippet 804 corresponds to the portion of the CADL 500 in bounding box 604 as illustrated in FIG. 6, snippet 812 corresponds to the portion of the CADL 500 in bounding box 612 as illustrated in FIG. 6, snippet 810 corresponds to the portion of the CADL 500 in bounding box 510 as illustrated in FIG. 5, snippet 816 corresponds to the portion of the CADL 500 in bounding box 616, snippet 818 corresponds to the card holders signature (which were two, distinct bounding boxes 618 and 620 in FIG. 6 for the first and last name, but may be treated as a signature unit in a single bounding box and snippet 818 as illustrated in FIG. 8), and snippet 820 corresponds to the portion of the CADL 500 in bounding box 520 as illustrated in FIG. 5. FIG. 8 illustrates other snippets associated with other content visible within other bounding boxes illustrated in FIG. 6 but may not be referenced or described herein for the sake of brevity and conciseness. It should also be understood that other or additional snippets (not shown) describing the other features or portions (or the same portion in other domains such as the edge domain) of the image may be generated but are not shown for the sake of clarity, brevity, and conciseness.

In some implementations, the bounding box(es) generated by the object detector 442 and/or an OCR engine 444 are used to crop the image associated with the transaction under test and thereby generate a snippet of the associated text or object contained therein. In some implementations, a snippet may not be consistent with, or coincide with, a bounding box applied by the object detector 442 and/or an OCR engine 444. For example, in some implementations, a single snippet may be based on a document template and incorporate, by way of example, the area of the cardholder's first name and last name to the full possible length of those two fields permitted by the cardholder; rather than, e.g., a first name snippet limited in length to the bounding box of the populated first name (i.e., "IMA" in CADL 500) and a last name snippet limited in length to the bounding box of the populated last name (i.e., "CARDHOLDER" in CADL 500).

It should be understood that, while a single object detector 442 and a single OCR engine 444 are illustrated in FIG. 4, different implementations may use one or more OCR engines 444 and/or one or more object detectors 442. For example, in some implementations, the OCR engine 444 represents a bank of multiple OCR engines with different detection qualities. As another example, in some implementations, the object detection engine 442 includes multiple different object detectors, (e.g., a first object detector for detecting holes such as a punch or laser perforation, a second object detector for detecting a human face in a photo ID, etc.)

Referring to FIG. 4, in some implementations, the transaction partitioner 304 includes an instance of the other transaction data partitioner 404. In some implementations, the other transaction data partitioner 404 may determine a set of non-image based transaction partitions. In some implementations, the non-image base transaction portions may include one or more of a set of entities associated with the transaction under test, a set of locations associated with a transaction under test, a set of devices associated with the transaction under test, and a fraud risk associated with the transaction under test.

In the example other transaction data partitioner 404 illustrated in FIG. 4, the other transaction data partitioner 404 includes an entity identifier 432, device identifier 434, location identifier 436, and a fraud risk determiner 438. Depending on the implementation and use case, one or more of the other transaction data partitioner 404 or its components 432, 434, 436, and 438 may optionally be omitted and/or the associated information may not be used in minigraph generations, classification, or decisions.

The entity identifier 432 identifies a set of entities associated with a transaction. The set of entities may include one or more of a first party to the transaction (e.g., a bank customer initiating the transaction), an entity processing the transaction (e.g., a bank), and a second party to the transaction (e.g., a recipient of funds transferred), a verification requester (e.g., the bank involved in the transaction or a third party such as a regulator or law enforcement), an entity type (e.g., merchant, individual, financial institution, government, etc.), etc.

The device identifier 434 determines a set of devices associated with the set of transactions. A device associated with the transaction under test may be identified based on one or more of, but not limited to, an electronic serial number, a MAC address, a make and model, a device fingerprint (e.g., metadata associated with an image indicative of an iPhone and/or particular model and/or iOS version), a channel associated with the transaction (e.g., was the transaction initiated through a mobile app, a browser, or an API), etc.

The location identifier 436 identifies a set of locations associated with the transaction under test. The set of locations associated with the transaction under test may include one or more of a physical and a network location. Examples of physical location may include or be based on GPS coordinates; location of an entity (e.g., location associated with debited account, location of credited bank account, physical location of person initiating the transaction), association of the IP address with a physical location or region, etc. Examples of network locations may include, but are not limited, to IP address, network ID, etc.

The fraud risk determiner 438 may determine a fraud risk based on the other transaction data. For example, when the transaction is associated with a location or entity with a higher incidence of fraud, or a requesting financial institution prefers false positive, which may be an inconvenience for the banks customer to have a valid transaction denied, over a false negative, which could result in upset and defrauded customer and possible reimbursement by the bank, the risk level may be elevated. In some implementations, the fraud risk level may be used by one or more of the partition look-up engine 308 which may adjust parameters such as how many results to obtain or a base level of similarity to prior transaction parts for inclusion in a result set, the graph classifier 310 which may affect the classification, and the transaction decision engine 312 which may affect a decision.

In some implementations, the other transaction data is determined based on structured data associated with the transaction under test. For example, the IP address may be extracted from a header, the requester may provide structured account holder data, and transaction (meta) data, etc.

The transaction partitioner 304 is communicatively coupled with other components of the mini-graph based fraud detector 226 (or components thereof) to provide the determined transaction parts, or subset(s) thereof, thereto. In some implementations, the transaction partitioner 304 may store the determined transaction parts in the memory 204 (or other data storage) for retrieval. In some implementations, the transaction partitioner 304 may send the transaction data to one or more other components of the mini-graph based fraud detector 226 (or components thereof). For example, in some implementations, the transaction partitioner 304 may send one or more image snippets (i.e., parts of an image associated with the transaction) to the partition embedder 308.

In some implementations, the partition look-up engine 308 determines, for a particular part of the transaction under test, a set of prior transaction parts (i.e., parts associated with prior transactions) that are most similar to the transaction part associated with the transaction under test. However, some transaction parts may not be readily suited for such a determination, also sometimes referred to herein as "search," "look-up," or similar. For example, transaction parts represented by unstructured data, such as image snippets, may be unsearchable or inefficiently searched by the partition look-up engine 308 without additional processing, e.g., generation of embeddings. Additionally, another challenge is obtaining search results that are similar but not an exact match. For example, consider two document holder images taken from images of the same identification document—the first as an image snippet associated with the transaction under test and the second associated with a previous transaction. Even a slight variation in conditions, the angle at which each was taken, the distance, the ambient lighting, etc. may produce very different representations (e.g., hashes) of the two image snippets, even though the images to the human eye may appear very similar or identical, and the imaged document is identical. As another example, OCR extraction of text from a surname of an identification document may introduce errors, e.g., a capital letter "i", the lowercase version of the letter "L," or even the numeral one (i.e., "I" and "1" and a "1") could be determined for the same letter in different instances. In some implementations, the graph-based fraud detector 226 includes the partition embedder 306, which may at least partially address some of these technical problems.

In some implementations, the partition embedder 306 generates embeddings based on at least a subset of the transaction parts associated with the transaction under test. Depending on the implementation and use case which of the transaction parts determined by the transaction partitioner are embedded may vary. In some implementations, the partition embedder 306 may generate an embedding for a full set of transaction parts determined by the transaction partitioner 304. For example, in some implementations, the partition embedder 306 may generate an embedding of each image snippet (e.g., multiple snippets of various portions of an image) and each block of text (e.g. surname, document ID number, etc. extracted via OCR and/or received as a string in the transaction data).

In some implementations, the partition embedder 306 may generate an embedding for a subset of transaction parts determined by the transaction partitioner 304. Many possible transaction parts have been described herein, e.g., many potential image snippets are possible for a single type of document, and various different entities may be associated with a transaction. In some implementations, the partition embedder may embed a reduced set of transaction parts. For example, some transaction parts may be found (e.g., via a feature reduction) to be more predictive of fraud, and the partition embedder 306 may generate embeddings associated with the reduced set of transaction parts.

The embedding may vary based on the implementation, use case, and type of data associated with transaction part (e.g., string data vs image data). In some implementations, the partition embedder 306 applies one or more vector-based embeddings. For example, the partition embedder 306 applies a first vector-based embedding to transaction parts that are image based, and a second vector-based embedding to transaction parts that are text based (e.g., strings.). In some implementations, different vector-based embeddings are used, by the partition embedder 306, for different transaction parts of the same data type. For example, in some implementations, the partition embedder 306 may obtain a higher-dimension vector embedding of a document holder image snippet (i.e., a first transaction part that is image data) than for a document number image snippet from the same identification document image (i.e., an example of a second transaction part that is image data). In some implementations, the same transaction part may be the basis for multiple embeddings. For example, in some implementations, the document number in an image snippet may be vectorized via embedding and that document number extracted from the using OCR may also be vectorized via embedding.

In some implementations, the partition embedder 306 determines an embedding from image data by using a convolutional neural network. In some implementations, the partition embedder 306 generates a textual embedding by using a large language model.

In some implementations, the partition embedder 306 the embedding generated for a particular transaction part may be optimized for that transaction part. For example, in some implementations, transaction parts that are found to be more indicative of fraud or that benefit from higher dimensional vectors to make such determinations may be embedded into a higher dimensional space, and transaction parts that are found to be less indicative of fraud or their predictive powers are largely preserved in a lower dimensional space, are embedded in lower dimensional embeddings. To summarize and simplify, in some implementations, the granular control of the embeddings used (e.g., on a per-transaction-part basis) and provided by the partition embedder 306 in some implementations may contribute to a greater system efficiency while preserving accuracy.

In some implementations, the partition embedder 306 may embed supplemental information, or meta data, associated with a transaction part. For example, when vectorizing text extracted from an image, the partition embedder 306 may vectorize not only the text characters but one or more characteristics such as font, font size, font style, etc. As another example, when vectorizing a document holder image snippet 810, the partition embedder 306 may vectorize not only the image data of that snippet but one or more subject characteristics such as approximate age of the subject and approximate gender of the subject (e.g., as determined using computer vision and machine learning).

In some implementations, the partition embedder 306 perform one or more error reduction measures prior to generating an embedding. For example, in some implementations, the partition embedder 306 may eliminate errors in text strings prior to embedding the corrected text string. Depending on the implementation and use case, the errors may be eliminated using, but not limited to, one or more of heuristics or machine learning based. In some implementations, the partition embedder 306 may apply a set of correction rules or heuristics, e.g., the partition embedder 306 determines the class of document associated with the transaction (or obtains that from the transaction partitioner 304), determines that valid instances of that class of document are characterized by ID numbers that is strictly numeric so any "O" obtained from OCR of the image is changed to the numeral "0" prior to embedding that text. In some implementations, the partition embedder 306 may apply machine learning, e.g., providing a name or address string to a large language model, which may correct an error introduced via OCR.

The partition embedder 306 is communicatively coupled with other components of the mini-graph based fraud detector 226 (or components thereof) to provide the partition embedding(s), thereto. In some implementations, the partition embedder 306 may store the partition embedding(s) in the memory 204 (or other data storage) for retrieval. In some implementations, the partition embedder 306 may send the partition embedding(s) to one or more other components of the mini-graph based fraud detector 226 (or components thereof). For example, in some implementations, the partition embedder 306 may send the partition embedding(s) to the partition look-up engine 308 and/or the transaction parts retention manager 314.

Figure 9A:
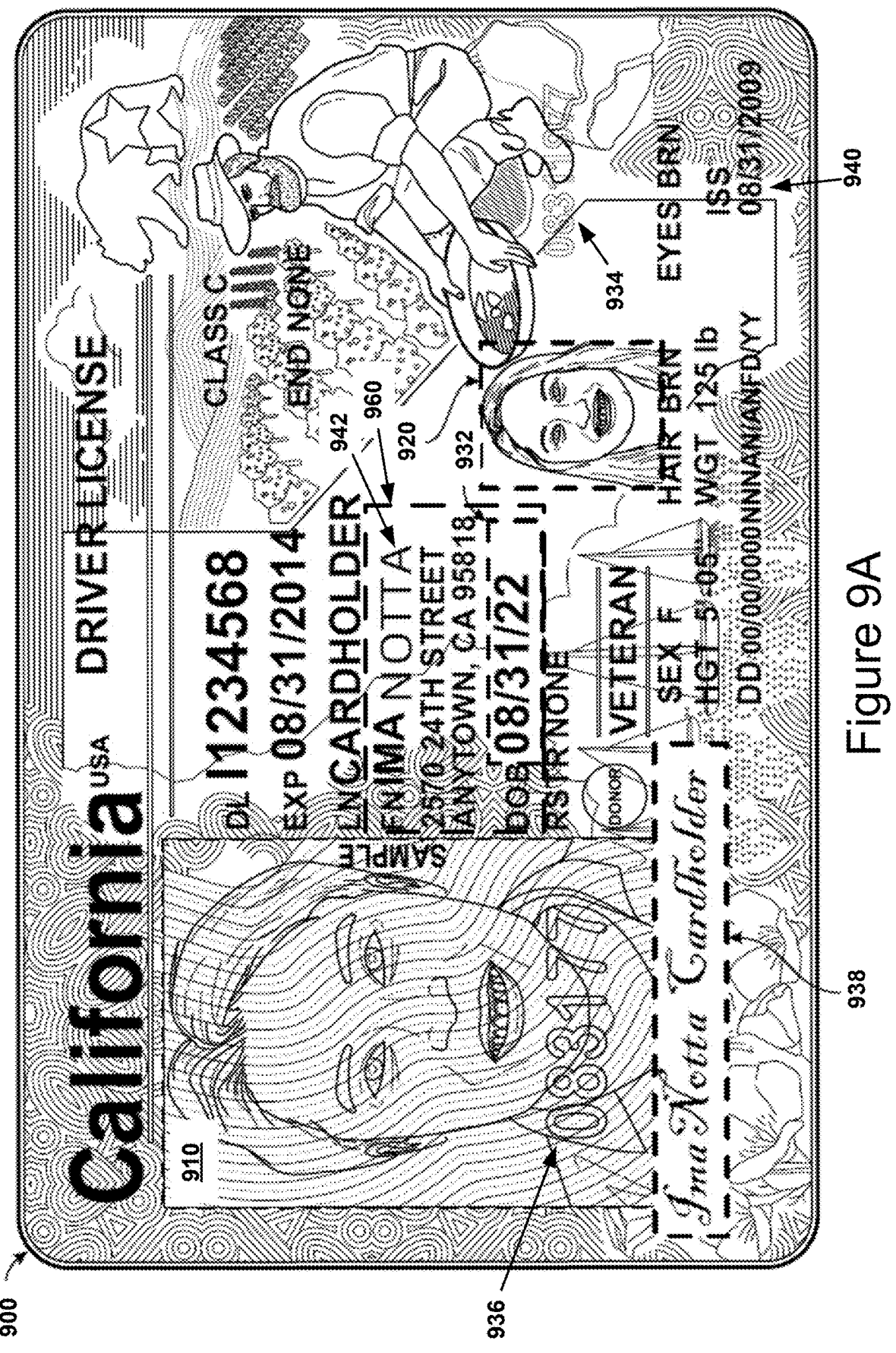
FIG. 9A illustrates an example of a CADL under test in accordance with some implementations.

To facilitate description and understanding of the partition look-up engine 308, the mini-graph generator 310, and the mini-graph classifier 312 it may be helpful to consider the following example. Assume now that CADL 500 of FIGS. 5 and 6 is associated with a prior transaction and that the parts of those transactions including the example snippets 802, 804, 810, 812, 816, 818, 820, etc. illustrated in FIG. 8 are stored in the transaction parts database 132 with transaction parts associated with other prior transactions. Further, assume that the CADL 900 illustrated in FIG. 9A is associated with the transaction under test and analogous snippets (i.e. snippets of the same portions of the CADL document represented by the snippets illustrated in FIG. 8 are generated as transaction parts by the transaction partitioner 304 and embedded by partition embedder 306.)

Figure 9B:
FIG. 9B illustrates portions of the example of the CADL under test in accordance with some implementations.

The illustrated CADL 900 represents a number of issues that indicate that it is fraudulent. The content of the DOB field 932 (i.e., Aug. 31, 2022) is inconsistent with the DOB in field 934 (i.e., 08311977), and in field 936 (i.e., 083177). The DOB in field 932 (i.e., Aug. 31, 2022) is after the date of issue 940 (i.e. Aug. 31, 2009). As of the writing of this application, an individual with the DOB of Aug. 31, 2022 is not yet two years old and insufficient age to be eligible for or issued a CADL. The document holder image 910 does not match the ghost image 920. The sex of the document holder in the image 910 (i.e., M) does not match the corresponding sex field, which indicates "F" or female. The signature at 938 has destroyed/lack the microprint background. The "NOTTA" portion of the FN is misaligned with the "IMA" portion and uses a different font. The text in the DOB field 932 (i.e. "Aug. 31, 2022"), which is magnified and more clearly illustrated in FIG. 9B.

In some implementations, the partition look-up engine 308 determines a set of prior transaction parts that are most similar to a transaction part associated with the transaction under test. The look-up mechanism may vary based on one or more of the implementations, use case, and transaction part. The look-up mechanisms may include one or more of a match-based look-up mechanism and a similarity-based look-up mechanism.

In some implementations, the look-up engine 308 may perform a match-based look-up for a first subset of transaction parts to identify a set of exact matches as the most similar prior transaction parts. For example, the look-up engine 308 looks-up the IP address associated with the transaction under test and identifies any exact matches associated with prior transactions. As another example, look-up engine 308 looks-up the extracted document number text (e.g. post error reduction/correction) and/or an embedding of the document number extracted from a document image via OCR for an exact match.

In some implementations, the look-up engine 308 may perform a similarity-based look-up for a first subset of transaction parts to identify a set of exact matches as the most similar prior transaction parts. In some implementations, the look-up engine 308 may perform a similarity-based look-up based on the embedding of a transaction part associated with the transaction under test. For example, in some implementations, the look-up engine 308 may perform a similarity-based look-up based on a vector embedding generated from the ghost image 920 of CADL 900 as the search criterion, which may return a set of embeddings associated with the similar ghost images associated with prior transactions and may include the embedding associated with snippet 820, which is associated with CADL 500.

The similarity-based look-up may be based on one or more look-up mechanisms. In some implementations, the look-up engine 308 evaluates the cosine similarity between the embedding of the first transaction part under test (i.e. an embedding associated with a first part of the transaction under test, such as the ghost image portion of a document image) to the embeddings of the first transaction part associated with other, prior transactions (i.e., the embeddings associated with the ghost images associated with prior transactions). Cosine similarity is merely one example of a similarity-based look-up method that may be used by the look-up engine 308. Other examples that may be used without departing from the disclosure herein include, but are not limited to, Euclidean distance, Manhattan distance, dot product, Minkowski distance, etc.

In some implementations, the look-up engine 308 performs multiple look-ups and obtain multiple result sets per transaction under test. For example, the look-up engine 308 may perform a first search for ghost images portions most-similar to 920 and obtain a first result set, perform a second search for document images most similar to the document holder image portion 910 and obtain a second result set, perform a third search based on the driver's license number portion of CADL 900 and obtain a third result set, etc.

In some implementations, the transaction parts that serve as the basis of the search may vary in scope (e.g., the portion of the document) and may not necessarily be distinct. For example, in some implementations, the look-up engine 308 may perform a first similarity-based look-up based on all text extracted an image of an identification document and perform a second similarity based look up based on just the first and last name on that document. In some implementations, the variation in scope may facilitate detection of different types of fraud. For example, when a fraudster modifies small portions of a document (e.g., changing only a name or DOB) the embeddings of all document text of the various documents may still be returned, by the look-up engine 308, while a look-up of only the modified parts (e.g., the name or DOB) may be dissimilar. In some implementations, a high degree of similarity at a high-level, but low similarity for a more granular part may be determined by the mini-graph classifier 312, described below, as indicative of fraud and/or what transaction part is fraudulent.

For example, for each transaction part under test, the look-up engine 308 may perform a look-up to find the prior transaction parts most similar to the transaction part under test. In some implementations, the look-up engine 308 may perform a look-up for a reduced set of transaction parts, i.e., a set of transaction parts of interest. In some implementations, the reduced set of transaction parts may be a subset of transaction parts determined to be most highly predictive/ indicative of fraud. In some implementations, the reduced set of transaction parts may be used as an initial filter. For example, in some implementations, a first reduced set of transaction parts is searched, the results used to generate an initial mini-graph, which is evaluated, when the classification of the initial mini-graph does not satisfy a threshold, additional transaction parts may be one or more of generated, embedded, searched, and added to an updated mini-graph for evaluation.

In some implementations, the look-up engine 308 may subject a result set to one or more thresholds. For example, in some implementations, the look-up engine 308 may require that a minimum measure of similarity threshold between the transaction part under test and a prior transaction part (or embeddings thereof) be satisfied for inclusion of the prior transaction part in the result set. As another example, in some implementations, the look-up engine 308 may subject the result set to a maximum, X, number of results, so that only the X most similar prior transaction parts are returned in the result set, which may limit the maximum size and complexity of a resulting mini-graph.

The most similar prior transaction parts in the result set(s) are associated with one or more underlying prior transactions. These underlying prior transactions may occasionally be referred to herein as matched transaction, matched prior transactions, or similar. In some implementations, look-up engine 308 may determine a degree of similarity between the transaction parts (e.g. of interest) associated with a given matched transaction and (1) the transaction parts (e.g. of interest) that are associated with the transaction under test, and (2) the transaction parts (e.g. of interest) that are associated with every other matched transaction. In some implementations, these similarities are included in the result set(s), e.g., to be included in the mini-graph generated by the mini-graph generator 310 as edge similarity data.

The look-up engine 308 is communicatively coupled with other components of the mini-graph based fraud detector 226 (or components thereof) to provide the result set(s) describing most similar prior transaction parts, thereto. In some implementations, the look-up engine 308 may store the result set(s) in the memory 204 (or other data storage) for retrieval. In some implementations, the look-up engine 308 may send the result set(s) to one or more other components of the mini-graph based fraud detector 226 (or components thereof). For example, in some implementations, the look-up engine 308 may send the result set(s) to the mini-graph generator 310.

In some implementations, the mini-graph generator 310 generates a mini-graph associated with the transaction under test. In some implementations, the mini-graph associated with the transaction under test is based on the prior transaction parts most similar to the transaction parts associated with the transaction under test based on the result set(s) obtained by the look-up engine 308.

The mini-graph generated by the mini-graph generator 310 includes a plurality of nodes and edges. In some implementations, the mini-graph generator 310 adds a plurality of nodes to the mini-graph to generate, at least in part, the mini-graph. In some implementations, each node in the mini-graph is associated with a transaction. For example, referring to FIG. 10, in some implementations, the mini-graph generator 310 adds a first node associated with the transaction under test 1002, also occasionally referred to a "query transaction node", "query node," or similar, and a plurality of matched transaction nodes, illustrated by nodes 1004 and 1006. In some implementations, each matched transaction node is associated with a prior transaction that is associated with at least one transaction part included in a result set returned by the partition look-up engine 308. For example, continuing the prior example, the query node 1002 may be added to the mini-graph to represent the transaction under test associated with CADL 900, matched transaction node A 1004 may represent a prior transaction associated with CADL 500 (e.g., because of the high degree of similarities between the embedding associated with ghost image 920 and the embedding associated with image snippet 820 and/or other parts of the two transactions or their associated images), and matched transaction node B represents a second transaction that is associated with at least one transaction part that was most similar (or matched) a transaction under test part (as determined by the partition look-up engine 308.

In some implementations, the mini-graph generator 310 may associate the query node with data describing the transaction under test. For example, in FIG. 10, the query transaction node 1002 contains transaction under test data 1022 describing the transaction under test. Examples of transaction under test data may include, but are not limited to, a date of the transaction, a type of a document associated with the transaction (e.g., a CADL, or particular version of a CADL), etc. It should be understood that the foregoing are merely examples and other, or different, transaction under test data is contemplated and may be included without departing from the description herein.

In some implementations, the mini-graph generator 310 may associate a matched transaction node with data describing that prior, matching transaction. For example, in FIG. 10, the matched transaction nodes 1004 and 1006 each contain an instance of past transaction data 1024 describing their respective prior transaction. Examples of past transaction data may include, but are not limited to, a date of the transaction, a type of document associated with the transaction (e.g., a CADL, or particular version of a CADL), a decision (e.g., whether the prior transaction was determined to be fraudulent or not), etc. It should be understood that the foregoing are merely examples and other, or different, past transaction data is contemplated and may be included without departing from the description herein.

In some implementations, the mini-graph generator 310 adds a plurality of edges to the mini-graph to generate, at least in part, the mini-graph. In some implementations, the mini-graph generator 310 adds an edge between the transaction under test node 1002 and each matched transaction node 1004 and 1006, represented by edges 1032 and 1034, respectively, in FIG. 10. In some implementations, the mini-graph generator 310 adds an edge between each matched transaction node (e.g., matched transaction node A 1004) and every other matched transaction node (e.g., matched transaction node B 1006), represented by edge 1036 in FIG. 10. It should be understood that FIG. 10, for clarity and convenience, is a simplified mini-graph illustrating an example in which the determined most similar transaction parts are associated with only two transactions. However, in practice, more than two transactions are likely to be implicated by, or associated with, the determined most similar prior transaction part results. The number of transactions, and matched transaction nodes, may also increase based at least in part on the number of different transaction parts that are of interest/associated with a look up.

In some implementations, the mini-graph generator 310 may associate an edge with edge similarity data. The edge similarity data may vary based on the implementation and use case. For example, in some implementations, the security feature(s) present or absent, or whether the documents associated with two transactions are the same type may determine whether the edge data includes an associated similarity score. As another example, where the transaction part is associated with an object in the background of a selfie, the edge similarity data may be based on whether a similar object appears in the background of selfies associated with other transactions. As another example, in some implementations, the transaction parts of interest may affect what similarities are evaluated and represented in the edge similarity data.

Figure 10:
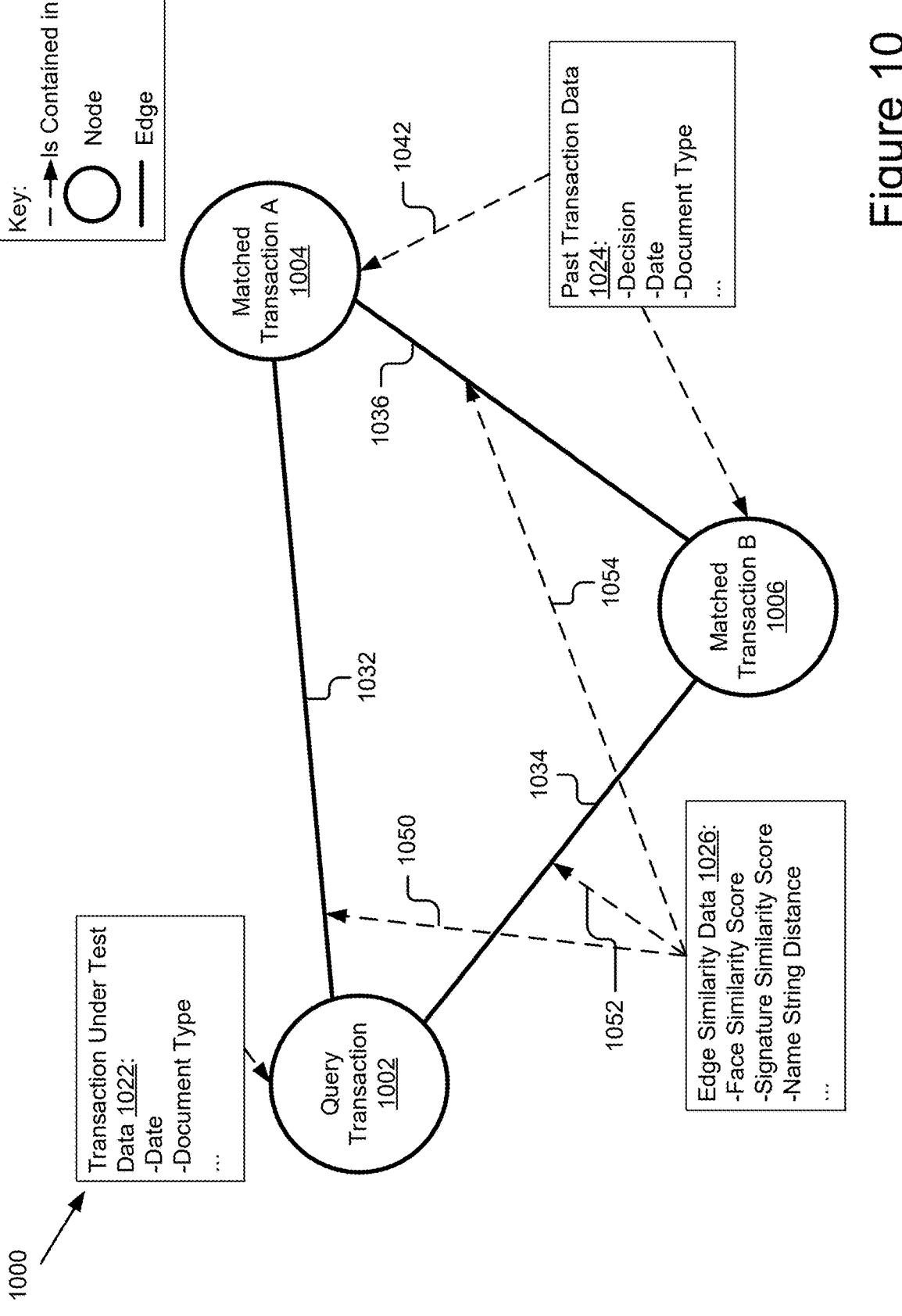
FIG. 10 illustrates examples of a mini-graph in accordance with some implementations.

In the illustrated example of FIG. 10, assume the transaction parts of interest are a face-based look-up (e.g., based on a similarity between two embeddings associated with the document holder image), a signature-based look-up (e.g., based on a similarity between two embeddings of a signature portion of the respective identification documents), a name look-up (e.g., based on a string distance between the two names). In the illustrated example of edge similarity data, edge 1032 contains edge similarity data including a face similarity score, a signature similarity score, and a name string distance between the respective transaction parts of the transaction under test and matched transaction A; edge 1034 contains edge similarity data including a face similarity score, a signature similarity score, and a name string distance between the respective transaction parts of the transaction under test and matched transaction B; edge 1032 contains edge similarity data including a face similarity score, a signature similarity score, and a name string distance between the respective transaction parts of matched transaction A and matched transaction B.

The mini-graph may provide a number of benefits. One benefit may include the efficient representation of the transaction under test as it relates to prior transactions that are most similar (or have parts that are most similar to the transaction under test) for use in machine learning, which is described below with reference to the mini-graph classifier 312. Another benefit may include an improved user interface, while in some implementations the mini-graph may not be presented to a human user. For example, in some implementations, the mini-graph may be presented to a human user via GUI. In some implementations, the mini-graph's representation of the transaction under test to prior transactions may facilitate, expedite, or improve a human's ability to determine whether a transaction under test is fraudulent. Depending on the implementation, the human may view the mini-graph in one or more contexts such as when generating labeled training data for training a machine learning model to perform classification, when auditing, reviewing, confirming, or correcting a classification determined by a machine learning model, etc.

The mini-graph generator 310 is communicatively coupled with other components of the mini-graph based fraud detector 226 (or components thereof) to provide the mini-graph associated with the transaction under test, thereto. In some implementations, the partition embedder 306 may store the mini-graph in the memory 204 (or other data storage) for retrieval. In some implementations, the mini-graph generator 310 may send the mini-graph to one or more other components of the mini-graph based fraud detector 226 (or components thereof). For example, in some implementations, the mini-graph generator 310 may send the mini-graph to the mini-graph classifier 312.

In some implementations, the mini-graph classifier 312 trains and uses a machine learning model to determine whether the mini-graph generated associated with the transaction under test is indicative of fraud or likely fraudulent.

In some implementations, the mini-graph classifier 312 trains and validates a machine learning model to classify a mini-graph associated with a transaction under test. In some implementations, prior transaction data associated with prior transactions labeled (e.g., as fraudulent or non-fraudulent) are obtained as test data. A mini-graph for each prior transaction as the transaction under test is generated, and a machine learning model is trained based on those mini-graphs representing the various prior transactions as transactions under test and the label corresponding to the prior transaction as the transaction under test.

In some implementations, the mini-graph generator 310 may generate a mini-graph associated with a prior transaction, present the mini-graph in isolation or with other information, depending on the implementation, to a human user for labeling (e.g., as fraudulent or non-fraudulent) in order to obtained labels, which may be used in training and/or validating the machine learning model.

The machine learning algorithm applied to the training data and resulting in the machine learning model applied to transactions under test in production may vary depending on the implementation and use case. In some implementations, the machine learning algorithm is a supervised machine learning algorithm and uses the labels associated with the prior transactions in the training data. An example of a supervised machine learning algorithm is a classification algorithm. Various machine learning algorithms including classification algorithms exist and may be trained without departing from the description herein.

In some implementations, the machine learning algorithm trained may use the mini-graph as an input directly. For example, in some implementations, the mini-graph classifier 312 trains and validates a graphical neural network (GNN)

with the mini-graphs generated with various prior, labeled transactions as the transaction under test as inputs.

In some implementations, the machine learning algorithm trained may be trained based on features descriptive of the mini-graph. Examples of features descriptive of the mini-graph may include, but are not limited to, a number of nodes, a ratio of nodes labeled as fraudulent, the top similarity of the first match (i.e. the similarity of the most similar transaction part across all result sets), number of matches on each transaction part (e.g., 5 similar signatures from the signature result set, 2 similar faces/ghost in the associated result set, etc.)

In some implementations, the mini-graph classifier 312 trains and validates a tree-based model. The tree-based model is trained based on a tree-based machine learning algorithm using features descriptive of the mini-graph, e.g., those described above. Examples of tree-based machine learning algorithms include, but are not limited to, decision trees, ensemble of trees, random forests, etc. and may include implementations such as XGBoost, CatBoost, Light GBM, or Sklearn.

In some implementations, the mini-graph classifier 312 uses the machine learning model to classify mini-graphs. For example, the mini-graph classifier 312 obtains a mini-graph associated with the transaction under test and outputs a class score, which is transformed into a classification. Depending on the implementation, the classification may vary. For example, depending on the implementation, the classification may be binary (e.g., fraudulent or non-fraudulent), use more than two classifications (e.g., high likelihood of fraud, unclear, and unlikely to be fraud), or may provide the probability of fraud (e.g., 0.98 or 98% likelihood that the transaction associated with CADL 900 is fraudulent).

In some implementations, the mini-graph classifier 312 may receive human input. For example, the mini-graph classifier 312 presents the mini-graph associated with a transaction under test via a user interface, as an improved user interface, and requests human classification of the mini-graph classifier 312. Depending on the implementation, the human classification may be confirmatory, e.g., to confirm the machine learning based classification of the transaction or make a final decision when the machine learning based classification is marginal or could go either way. In some implementations, the human classification may be used in subsequent training or retraining of the mini-graph classification machine learning model, e.g., to reduce false positives, or false negatives, or better handle marginal/edge cases.

The transaction decision engine 314 determines whether to authenticate the transaction. In some implementations, the transaction decision engine 314 obtains a classification of the mini-graph from the mini-graph classifier 314. In some implementations, the mini-graph classification is determinative of whether the transaction decision engine 314 authenticates the transaction or not. For example, when the mini-graph classifier 310 classifies the mini-graph associated with the transaction under test as fraudulent (e.g., based on a binary classification, satisfaction of a probability of fraud, or other), the transaction decision engine 314 determines that fraud has been detected and action is taken based on that determination.

In some implementations, the transaction decision engine 314 obtains other information. The other information may vary based on the implementation and use case. In some implementations, the other information may include other authentication signal data associated with the transaction. The other authentication signal data associated with the transaction may include one or more results of other authentication checks performed in association with the transaction or portions thereof (e.g., analyses performed on various images). For example, results of internal consistency checks between components of an identification document (e.g., whether the gender of the face matches the gender on the card, whether the driver's license number has the correct length or format), results of a comparison against a black list (e.g., accounts with suspicious activity such as transactions associated with structuring or prior, recent fraud attempts, entities on sanctions lists or terrorist watch lists, etc.), the results of a liveness check, etc. The foregoing are merely examples of potential other authentication signal data associated with the transaction, but others exist and are so numerous as to defy a complete listing but may be used without departing from the disclosure herein.

In some implementations, the transaction decision engine 314 performs an action based at least in part on the classification of the mini-graph. Examples of an action may include, but are not limited to, one or more of denying the transaction, permitting the transaction, reporting the transaction to authorities (e.g., law enforcement or regulators), escalating the transaction. In some implementations, escalating the transaction may result in additional analysis of the transaction. Depending on the implementation, the additional analysis may be performed by the mini-graph based fraud detector 226 (e.g., using additional transaction parts to supplement/expand the mini-graph and classifying the updated mini-graph) or by applying other or additional analysis to the transaction.

In some implementations, the transaction parts retention manager 314 manages the transaction parts database 132. In some implementations, the transaction parts database 132 stores transaction part data associated with prior transaction for look-up by the partition look-up engine 308. In some implementations, the data associated with the transaction under test is added, by the transaction parts retention manager 314 to the transaction parts database 132, as new prior transaction part data, e.g., after the mini-graph for the transaction under test is generated.

In some implementations, the transaction parts data retained in the transaction parts database 132 is limited to the data that may be used as or to determine the past transaction data (e.g. 1022) or edge similarity (e.g., 1026). For example, referring to the example illustrated in FIG. 10, the date of the transaction, a document type associated with the transaction, and a decision (e.g., fraudulent or not) may be retained for future use as past transaction data; the embedding associated with a face, the embedding associated with a signature, the name string, etc. may be retained in association with the transaction.

In some implementations, significant portions of the transaction data are not retained. In some implementations, the transaction parts retention manager 314 retains only that information which may appear in a mini-graph generated for a future transaction under test and/or which may be used to reproduce the transaction's mini-graph. For example, in some implementations, the transaction parts retention manager 314 does not retain the snippet of the facial image portion in the document, the snippet of the signature portion of the identification document, or the name portion of the identification document from which string was extracted; rather, the transaction parts retention manager 314 retains an embedding associated with the document holder image portion, an embedding of the signature portion of the identification document, and the string extracted from the identification document or a vectorization thereof. It should be recognized that such implementations may reduce resource utilization, such as the amount of memory occupied by the transaction parts database 242 and searched by the partition look-up engine 308. For example, a vector embedding associated with a document holder image may be much smaller than the snippet of the high-definition photo from which it was derived.

In some implementations, the received image (e.g., document image or selfie) may be retained with the associated embeddings. It should be understood that, for the look-up to function properly, the embedding being queried needs to have been generated in an analogous manner to the embeddings associated with prior transactions being searched. For example, the snippet needs to be generated the same way and embedded using the same algorithm. In some implementations, the received input image(s) associated with prior transactions are preserved so that a change to one or more of: how the image is pre-processed, how a snippet is generated (e.g., from bounding box to contour-based segmentation), what snippets are generated (e.g., generating a snippet for a portion not previously associated with its own segment), a change to what snippets are used to derive embeddings (e.g., a snippet has become more determinative over time, so that snippet is embedded and searched), a change in how a segment is embedded (e.g., an updated neural network generates a new embedding, which is more accurate when used), etc. may be applied to the images associated with prior transactions and images under test, so the similarity or matching determination of the look-up is "apples-to-apples."

In some implementations, the transaction parts retention manager 314 manages the transaction parts database 132 to facilitate more efficient operation including look-up. In some implementations, the more efficient operation is based on one or more of indexing and curation.

In some implementations, the transaction parts retention manager 314 curates the transaction part data maintained in the transaction parts database 132. In some implementations, the curation is time-based, decision-based, or a combination thereof. For example, in some implementations, the transaction parts retention manager 314 may maintain transaction parts data associated with recent transactions. In some implementations, the recent transactions are transactions within s a rolling, fixed time period (e.g., within the last 7 days, 30 days, 90 days, 3 months, 6 months, one-year, or other time period). In some implementations, the fixed time period is based on an analysis of fraud patterns. For example, assume that fraudsters usually attempt fraud in batches (e.g., a large number of fraudulent attempts in a short period of time) or in a trickle (e.g., a few attempts every other week). In such a case, the optimum time period may be just long enough to capture a few instances of the typical trickle-type fraudster (e.g., a few months). Setting the time period much beyond that period may have diminishing returns, as the transaction parts data is likely to include at least one if not multiple instance of prior fraudulent transactions, and result in one or more of slower look-ups, larger graphs, and may yield little in improved prediction accuracy at least in some implementations.

In some implementations, the recent transactions are the X most recent transactions (e.g., the last 100*k*, 1M, or other number of transactions). As another example, in some implementations, transaction parts data associated with a transaction determined to be fraudulent is retained or retained longer (i.e., a combination of decision-based and time-based curation).

In some implementations, the transaction parts retention manager 314 indexes the transaction part data for more efficient look-up. In some implementations, the indexing incorporates information about nearest or most similar neighbors. For example, in some implementations, the transaction parts retention manager 314 uses Hierarchical Navigable Small World (HNSW) used for index construction and HNSW is used by the partition look-up engine 308 during look-up to obtain result sets. As another example, in some implementations, the transaction parts retention manager 314 uses K-means clustering as an index approach.

It should be apparent that systems, methods, features, and functionalities described herein provide a number of potential benefits. For example, the systems, methods, features, and functionalities described herein may provide a highly flexible architecture that can rapidly adapt to keep up with the highly dynamic nature of fraud. For example, as new documents and/or new security features are added to documents, those documents and/or security features may be rapidly incorporated into the mini-graph. As another example, in some implementations, the one or more of transaction parts used/analyzed/embedded/graphed, the embedding method(s), and the machine learning model(s), etc. used are flexible, and may be adjusted or retrained to maintain accuracy as transactions, fraud, and documents change over time.

As another example, the systems, methods, features, and functionalities described herein may provide decisions quickly and use less resources (e.g., money, time, or computational resources such as memory, processors cycles, electricity, I/Os, etc.).

In some implementations, the systems, methods, features and functionalities described herein may detect fraudulent activity that may not have been detected by a human (e.g., looking at a transaction in isolation and/or without a mini-graph). For example, a sophisticated user of photo editing may be able to modify a document so that the modification/anomaly is indistinguishable to a human eye, but the systems, methods, features and functionalities described herein may, in some implementations, identify such modifications, if not directly, based on similarity to other transactions as represented in the mini-graph In some implementations, the systems, methods, features and functionalities described herein may be layered with others. For example, the systems, methods, features and functionalities described herein may, in some implementations, be used in conjunction with liveness detection, so that, when the transaction is determined to be valid based at least in part on the mini-graph, a liveness detector (not shown) may determine whether a user that submitted the document is live.

Example Methods

FIGS. 11-14 are flowcharts of example methods that may, in accordance with some implementations, be performed by the systems described above with reference to FIGS. 1-4. The example methods 1100, 1110, 1114, 1116 of FIGS. 11-14 are provided for illustrative purposes, and it should be understood that many variations exist and are within the scope of the disclosure herein.

FIG. 11 is a flowchart of an example method 1100 for mini-graph based fraud detection in accordance with some implementations. At block 1102, the transaction data obtainer 302 obtains transaction data including an image, the transaction data associated with a transaction under test. At block 1104, the transaction partitioner 304 partitions the image into snippets. At block 1106, the partition embedder 306 generates an embedding associated with each snippet, or a subset or reduced set thereof. At block 1108, the partition look-up engine 308 obtains (e.g. via a search for each transaction part associated with the document under test for which a snippet and embedding were generated) a set of the most similar transaction parts associated with prior transaction partitions. At block 1110, the mini-graph generator 310 generates a mini-graph representation based on the embeddings associated with transaction under test and the set of most similar embeddings associated with prior transaction partitions. At block 1112, the mini-graph classifier 312 classifies the generated mini-graph based on a machine learning model. At block 1114, the transaction decision engine 314 determines (optionally in some implementations) whether the transaction is fraudulent. At block 1116, the transaction parts retention manager 316 (optionally in some implementations) retains embeddings associated with the transaction under test.

FIG. 12 is a flowchart of an example method 1110 for generating a mini-graph in accordance with some implementations. At block 1202, the mini-graph generator 310 generates a query node associated with the transaction under test. At block 1204, the mini-graph generator 310 generates a node associated with each matching prior transaction. At block 1206, the mini-graph generator 310 adds an edge between the query node and each matching prior transaction node, the edge associated with similarity data describing at least one similarity (or measure thereof) between a transaction under test part and a matching prior transaction part. At block 1208, the mini-graph generator 310 adds an edge between each matching prior transaction node and the other prior transaction nodes, the edge associated with similarity data describing at least one similarity between the two matching prior transaction part.

FIG. 13 is a flowchart of an example method 1114 for determining whether the transaction under test is fraudulent based at least in part on the mini-graph in accordance with some implementations. At block 1302, the transaction decision engine 314 obtains a classification of the mini-graph. At block 1304, the transaction decision engine 314 obtains other authentication determination signal data associated with the transaction under test. At block 1306, the transaction decision engine 314 determines whether the transaction is fraudulent based on the graph classification and other authentication determination signal data. At block 1308, the transaction decision engine 314 determines an action based on the determination at block 1306.

Other Considerations

It should be understood that the above-described examples are provided by way of illustration and not limitation and that numerous additional use cases are contemplated and encompassed by the present disclosure. In the above description, for purposes of explanation, numerous specific details are set forth in order to provide a thorough understanding of the present disclosure. However, it should be understood that the technology described herein may be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

Reference in the specification to "one implementation" or "an implementation" or "some implementations" means that a particular feature, structure, or characteristic described in connection with the implementation is included in at least one implementation. The appearances of the phrase "in some implementations" in various places in the specification are not necessarily all referring to the same implementations.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of a hardware implementation, a software implementation, or implementations containing both hardware and software elements. For instance, the technology may be implemented in software, which includes but is not limited to firmware, resident software, microcode, etc. Furthermore, the technology can take the form of a computer program product accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As should be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats.

Furthermore, the modules, routines, features, attributes, methodologies, engines, and other aspects of the disclosure can be implemented as software, hardware, firmware, or any combination of the foregoing. Also, wherever an element, an example of which is a module, of the specification is implemented as software, the element can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment. Accordingly, the disclosure is intended to be illustrative, but not limiting, of the scope of the subject matter set forth in the following claims.

What is claimed is:

1. A method comprising:
   obtaining, using one or more processors, transaction data associated with a transaction under test, the transaction data including image data associated with a first image;
   generating, using the one or more processors, a set of transaction parts, the set of transaction parts including a first transaction part and a second transaction part, the first transaction part associated with a first image snippet, the first image snippet associated with a first portion of the first image;
   generating, using the one or more processors, a first embedding, wherein the first embedding is based on the first image snippet;
   obtaining, using the one or more processors, via a first search of prior transaction parts, a first result set, the first result set comprising a first set of embeddings associated with a first set of prior transactions, and the first set of prior transactions comprises prior transactions associated with embeddings of the first portion that are most similar to the first embedding associated with the transaction under test;
   obtaining, using the one or more processors, via a second search of prior transaction parts, a second result set, the second result set based on a second transaction part, the second result set associated with a second set of prior transactions, the second set of prior transactions comprising transactions associated with second transaction parts most similar to the second transaction part associated with the transaction under test;
   generating, using the one or more processors, a mini-graph associated with the transaction under test, wherein the mini-graph associated with the transaction under test is based on the transaction under test, the first set of prior transactions, the second set of prior transactions, the first transaction part, and the second transaction part; and
   classifying, using the one or more processors and using a first machine learning model, whether the mini-graph associated with the transaction under test is indicative of fraud.

2. The method of claim 1, wherein the first image represents a human face, and wherein the first image includes at least one of a selfie and an image of an identification document.

3. The method of claim 1, wherein the first image represents and identification document, wherein the first portion is a first portion of an identification document, and wherein the first portion of the identification document includes one or more of a document holder image, a security feature, a field name, and a field value.

4. The method of claim 1, wherein the first embedding includes a vector embedding.

5. The method of claim 1, wherein the second transaction part includes at least one of a second image snippet associated with a second portion of the first image, and text extracted from the first image.

6. The method of claim 1, wherein generating the mini-graph associated with the transaction under test comprises:
   generating a set of nodes, wherein a node is generated for:
      the transaction under test, each transaction comprising the first set of prior transactions, and each transaction comprising the second set of prior transactions; and generating a plurality of edges, wherein each edge:

connects between two nodes, wherein the two nodes include:

a first node associated with the transaction under test and a second node that is associated with a prior transaction, or two nodes associated with prior transactions from one or more of the first set of prior transactions and the second set of prior transactions; and is associated with a similarity of a particular transaction part between the two transactions associated with the two nodes.

7. The method of claim 1, the method further comprising:

training the first machine learning model using a tree-based approach based on features describing labeled mini-graphs associated with prior transactions.

8. The method of claim 1, the method further comprising:

training the first machine learning model using a graphical neural network using mini-graphs associated with labeled prior transactions directly as training data.

9. The method of claim 1, the method further comprising:

presenting, in a user interface, a mini-graph to human user and receiving a decision, wherein the decision is one or more of confirmatory of the classification of the mini-graph using the first machine learning model and used as a label for subsequent training.

10. The method of claim 1, the method further comprising:

indexing prior transaction parts data using one or more of Hierarchical Navigable Small World and k-means clustering.

11. A system comprising:

a processor; and a memory, the memory storing instructions that, when executed by the processor, cause the system to:

obtain transaction data associated with a transaction under test, the transaction data including image data associated with a first image;

generate a set of transaction parts, the set of transaction parts including a first transaction part and a second transaction part, the first transaction part associated with a first image snippet, the first image snippet associated with a first portion of the first image;

generate a first embedding, wherein the first embedding is based on the first image snippet;

obtain, via a first search of prior transaction parts, a first result set, the first result set comprising a first set of embeddings associated with a first set of prior transactions, and the first set of prior transactions comprises prior transactions associated with embeddings of the first portion that are most similar to the first embedding associated with the transaction under test;

obtain, via a second search of prior transaction parts, a second result set, the second result set based on a second transaction part, the second result set associated with a second set of prior transactions, the second set of prior transactions comprising transactions associated with second transaction parts most similar to the second transaction part associated with the transaction under test;

generate a mini-graph associated with the transaction under test, wherein the mini-graph associated with the transaction under test is based on the transaction under test, the first set of prior transactions, the second set of prior transactions, the first transaction part, and the second transaction part; and classify, using a first machine learning model, whether the mini-graph associated with the transaction under test is indicative of fraud.

12. The system of claim 11, wherein the first image represents a human face, and wherein the first image includes at least one of a selfie and an image of an identification document.

13. The system of claim 11, wherein the first image represents and identification document, wherein the first portion is a first portion of an identification document, and wherein the first portion of the identification document includes one or more of a document holder image, a security feature, a field name, and a field value.

14. The system of claim 11, wherein the first embedding includes a vector embedding.

15. The system of claim 11, wherein the second transaction part includes at least one of a second image snippet associated with a second portion of the first image, and text extracted from the first image.

16. The system of claim 11, wherein generating the mini-graph associated with the transaction under test comprises:

generating a set of nodes, wherein a node is generated for:

the transaction under test, each transaction comprising the first set of prior transactions, and each transaction comprising the second set of prior transactions; and generating a plurality of edges, wherein each edge:

connects between two nodes, wherein the two nodes include:

a first node associated with the transaction under test and a second node that is associated with a prior transaction, or two nodes associated with prior transactions from one or more of the first set of prior transactions and the second set of prior transactions; and is associated with a similarity of a particular transaction part between the two transactions associated with the two nodes.

17. The system of claim 11, wherein the instructions, when executed, cause the system to:

train the first machine learning model using a tree-based approach based on features describing labeled mini-graphs associated with prior transactions.

18. The system of claim 11, wherein the instructions, when executed, cause the system to:

train the first machine learning model using a graphical neural network using mini-graphs associated with labeled prior transactions directly as training data.

19. The system of claim 11, wherein the instructions, when executed, cause the system to:

present, in a user interface, a mini-graph to human user and receiving a decision, wherein the decision is one or more of confirmatory of the classification of the mini-graph using the first machine learning model and used as a label for subsequent training.

20. The system of claim 11, wherein the instructions, when executed, cause the system to:

index prior transaction parts data using one or more of Hierarchical Navigable Small World and k-means clustering.

* * * * *